(12) United States Patent
Mukaida et al.

(10) Patent No.: US 10,434,437 B2
(45) Date of Patent: Oct. 8, 2019

(54) EVAPORATION DEVICE

(71) Applicant: KANSAI CHEMICAL ENGINEERING CO., LTD., Hyogo (JP)

(72) Inventors: Tadahiro Mukaida, Hyogo (JP); Hiroshi Yamaji, Hyogo (JP); Hideo Noda, Hyogo (JP)

(73) Assignee: Kansai Chemical Engineering Co., Ltd., Amagasaki-shi, Hyogo (JP)

( * ) Notice: Subject to any disclaimer, the term of this patent is extended or adjusted under 35 U.S.C. 154(b) by 0 days.

(21) Appl. No.: 15/539,201

(22) PCT Filed: Mar. 8, 2016

(86) PCT No.: PCT/JP2016/057101
§ 371 (c)(1),
(2) Date: Jun. 23, 2017

(87) PCT Pub. No.: WO2016/143776
PCT Pub. Date: Sep. 15, 2016

(65) Prior Publication Data
US 2018/0015386 A1    Jan. 18, 2018

(30) Foreign Application Priority Data

Mar. 9, 2015  (JP) ................................. 2015-045885

(51) Int. Cl.
*B01D 1/22* (2006.01)
*B01F 15/06* (2006.01)
(Continued)

(52) U.S. Cl.
CPC ........... *B01D 1/223* (2013.01); *B01D 1/0064* (2013.01); *B01D 1/0088* (2013.01); *B01D 1/305* (2013.01);
(Continued)

(58) Field of Classification Search
CPC .... B01D 1/0064; B01D 1/0088; B01D 1/223; B01D 1/305; B01D 3/008; B01D 3/10;
(Continued)

(56) References Cited

U.S. PATENT DOCUMENTS 3,190,817 A    6/1965  Neugebauer et al.
3,458,404 A *  7/1969  Vincent .................. B01D 1/065
                                              159/13.2
(Continued)

FOREIGN PATENT DOCUMENTS

CA    2762285 A1      11/2010
DE    3204262 A1 *   8/1983  ............. B01D 1/223
(Continued)

OTHER PUBLICATIONS

DE3204262A1_ENG (Escpacenet machine translation of Evkin DE3204262A1, accessed on Nov. 8, 2018) (Year: 1983).*
(Continued)

*Primary Examiner* — Youngsul Jeong
*Assistant Examiner* — Gabriel E Gitman
(74) *Attorney, Agent, or Firm* — Ajay A. Jagtiani; Miles & Stockbridge P.C.

(57) ABSTRACT

An evaporation device including an agitation vessel to which raw material liquid is supplied. The agitation vessel has a volatile component outlet and a concentrate outlet, a jacket provided on an outer circumference and configured to heat an inner wall, and a liquid-distributing portion configured to cause the raw material liquid to flow down the inner wall. The agitation vessel includes storage portion surrounded by a bottom, the inner wall, and a partition wall portion configured to temporarily store the raw material liquid that flows down, the liquid-distributing portion is constituted by a rotating shaft and at least one channel part having a flow passage which, as the rotating shaft rotates, the raw material liquid temporarily stored in the storage portion flows upward from a lower side of the agitation vessel. The channel part is mounted to the rotating shaft, and the concentrate outlet is provided in the bottom.

8 Claims, 18 Drawing Sheets

(51) Int. Cl.
    *B01D 5/00*    (2006.01)
    *B01F 7/18*    (2006.01)
    *B01D 1/00*    (2006.01)
    *B01D 1/30*    (2006.01)
    *B01D 3/00*    (2006.01)
    *B01D 3/10*    (2006.01)

(52) U.S. Cl.
    CPC .............. *B01D 3/008* (2013.01); *B01D 3/10* (2013.01); *B01D 5/006* (2013.01); *B01F 7/18* (2013.01); *B01F 15/06* (2013.01); *B01F 2015/062* (2013.01)

(58) Field of Classification Search
    CPC . B01D 5/006; B01F 7/18; B01F 15/06; B01F 2015/062
    See application file for complete search history.

(56) References Cited

U.S. PATENT DOCUMENTS

| | | | | |
|---|---|---|---|---|
| 3,486,743 A | * | 12/1969 | Todd | B01D 1/0088 159/18 |
| 3,505,172 A | * | 4/1970 | Achener | B01D 1/0017 159/13.1 |
| 3,880,668 A | * | 4/1975 | Miller | B01D 1/22 127/16 |
| 4,199,398 A | * | 4/1980 | Evkin | B01D 1/223 159/6.1 |
| 4,584,064 A | * | 4/1986 | Ciais | B01D 1/222 159/22 |
| 7,011,708 B2 | * | 3/2006 | Noda | B01D 9/0013 117/200 |
| 7,540,651 B2 | * | 6/2009 | Matsumoto | B01F 5/104 165/92 |
| 2003/0190271 A1 | | 10/2003 | Noda et al. | |
| 2006/0231378 A1 | * | 10/2006 | Glasl | B01D 1/225 202/176 |
| 2015/0038736 A1 | * | 2/2015 | Morioka | C07C 67/58 560/218 |
| 2018/0015386 A1 | * | 1/2018 | Mukaida | B01F 15/06 |

FOREIGN PATENT DOCUMENTS

| | | |
|---|---|---|
| JP | 60-082101 A | 5/1985 |
| JP | 60082101 A | 5/1985 |
| JP | 11-235522 | 8/1999 |
| JP | 2000-271404 A | 10/2000 |
| JP | 2000271404 A | 10/2000 |
| WO | 200226374 A1 | 4/2002 |
| WO | 2013136874 A1 | 9/2013 |

OTHER PUBLICATIONS

International Search Report dated May 31, 2016 received in PCT/JP2016/057101.

* cited by examiner

EVAPORATION DEVICE

TECHNICAL FIELD

The present invention relates to an evaporation device, and more specifically relates to an evaporation device with which solvent recovery from and concentration of a liquid can be efficiently performed.

BACKGROUND ART

In the food industry and the chemical industry fields, for example, a type of evaporation device called "falling film evaporation device" is used to recover a solvent from a liquid containing foreign substances and impurities or to concentrate the liquid.

FIG. 16 is a diagram schematically showing an evaporation system including a conventional falling film evaporation device.

An evaporation system 900 includes a raw material tank 910 containing a raw material liquid serving as a raw material, a falling film evaporation device 800, a vacuum pump 920, and a condenser 930. The raw material liquid is caused to flow from the raw material tank 910 to a preheater 906 through a conduit 904 by driving of the pump 902, temporarily preheated in the preheater 906, and then fed to the evaporation device 800.

FIG. 17 is a diagram schematically showing a portion of a cross section of the evaporation device 800 constituting the evaporation system shown in FIG. 16.

As shown in FIG. 17, the evaporation device 800 includes an agitation vessel 810, a first rotating shaft 820 extending in the vertical direction within the agitation vessel 810 and being rotatable in the horizontal direction, a plurality of supports 822 individually extending in the horizontal direction from the first rotating shaft 820 in an upper portion and a lower portion of the agitation vessel 810, and rollers 826 extending downward from the respective supports 822 and being provided so as to come into contact with an inner wall of the agitation vessel 810. An outer circumference of the first rotating shaft 820 is covered by a second rotating shaft 821. The first rotating shaft 820 and the second rotating shaft 821 are independently rotatably connected to a driving motor portion 840. Moreover, in many other conventional evaporation devices, the first rotating shaft 820 and the second rotating shaft 821 are integrally configured and rotate at the same rotation rate.

The raw material liquid 834 fed from the raw material tank is supplied to an upper portion of the inner wall of the agitation vessel 810 through supply ports 832 extending in the horizontal direction from the second rotating shaft 821, while being rotated as per driving of the driving motor portion 840. After that, the raw material liquid 834 flows downward along the inner wall of the agitation vessel 810 while forming a wet surface. On the other hand, an outer circumference of the agitation vessel 810 is covered by a jacket 812 that can be heated by steam, for example, and, as a result of being heated via the jacket 812, a volatile component contained in the raw material liquid evaporates while the raw material liquid flows down. The evaporated volatile component is fed to the condenser 930 (FIG. 16) provided outside the evaporation device 800 through a vapor outlet 860. The volatile component is cooled in the condenser 930 and then collected as a distillate liquid. On the other hand, in FIG. 17, components contained in the raw material liquid other than the above-described volatile component flow down the inner wall of the agitation vessel 810 as is, and are discharged to the outside of the evaporation device 800 through discharge ports 880 provided in a bottom of the agitation vessel 810.

While the raw material liquid flows down within the agitation vessel 810 as described above, the driving motor portion 840 drives the rollers 826 provided on the respective supports 822 to circle along the inner wall of the agitation vessel 810 while being in contact therewith.

FIG. 18 is a diagram schematically showing a cross section of the conventional evaporation device 800 shown in FIG. 17 taken in the direction A-A'. In the evaporation device 800, the rollers 826 are in contact with and circle along the inner wall of the agitation vessel 810 heated by the jacket 812, thereby forcibly subjecting the raw material liquid present on a heat transfer surface of the inner wall to surface renewal, and thus, the evaporation efficiency can be increased. Although FIG. 17 shows that the rollers 826 are provided, in conventional evaporation devices, wipers may be provided instead of the rollers 826.

However, some matters of concern have been pointed out with respect to such evaporation devices.

One of those matters is that the supplied raw material liquid passes down the inner wall (heat transfer surface) within the agitation vessel by flowing down only once through a so-called "one path". Also, in the case where the raw material liquid contains a large amount of a volatile component or in the case where the volatile component cannot be sufficiently evaporated while the raw material liquid flows down the inner wall, it is considered that the remaining components is discharged through the discharge ports 980 as is. For this reason, it has been recognized that the use of such an evaporation device for a raw material liquid that is required to be sufficiently concentrated is difficult.

Another matter is that rollers such as those shown in FIG. 17 or wipers are continuously in contact with the heat transfer surface and are thus likely to wear out. For this reason, regular replacement is required, and it has been pointed out that the working hours, labor, and costs for maintenance increase accordingly.

Another matter is that, in the case where the evaporation device is to be stopped, since the temperature of the inner wall is higher than the liquid temperature, if the supply of the raw material liquid is stopped as is, the rollers or the wipers, which are in contact with the inner wall, will deform or deteriorate due to high temperature. For this reason, when the evaporation device is to be stopped, it is necessary to continue the supply of the raw material liquid until the temperature of the inner wall falls.

SUMMARY OF THE INVENTION

Problem to be Solved by the Invention

The present invention was made to address the above-described problems, and it is an object thereof to provide an evaporation device with which a volatile component can be more efficiently evaporated from a raw material liquid, and liberation from the troublesomeness of maintenance and repair can be achieved.

Means for Solving the Problem

The present invention provides an evaporation device comprising:

an agitation vessel to which a raw material liquid is supplied, wherein the agitation vessel has a volatile component outlet and a concentrate outlet;

a jacket provided on an outer circumference of the agitation vessel and configured to heat an inner wall of the agitation vessel; and a liquid-distributing portion provided within the agitation vessel and configured to cause the raw material liquid to flow down the inner wall of the agitation vessel, wherein the agitation vessel includes at least one storage portion surrounded by a bottom of the agitation vessel, the inner wall, and a partition wall portion and configured to temporarily store the raw material liquid that has flowed down, the liquid-distributing portion is constituted by a rotating shaft and at least one channel part with an end portion thereof inserted in the storage portion, the channel part having a flow passage through which, as the rotating shaft rotates, the raw material liquid temporarily stored in the storage portion flows upward from a lower side of the agitation vessel, and the channel part being mounted to the rotating shaft, and the concentrate outlet is provided in the bottom of the agitation vessel.

In one embodiment, the storage portion is configured to allow a concentrate to overflow over the partition wall portion, and the concentrate that has overflowed from the storage portion can be discharged through the concentrate outlet.

In one embodiment, a splash-preventing part is provided at an upper end portion of the channel part, and the raw material liquid that has flowed from the storage portion is caused to flow down the inner wall of the agitation vessel via the splash-preventing part.

In one embodiment, the channel part includes a plurality of first channel parts, and the plurality of first channel parts are provided at substantially equal angles around the rotating shaft.

In a further embodiment, the channel part includes a plurality of second channel parts, and the plurality of second channel parts are arranged outward of the plurality of first channel parts at substantially equal angles around the rotating shaft.

In a further embodiment, the channel part includes a plurality of second channel parts, and, on the rotating shaft, the plurality of second channel parts are arranged above the plurality of first channel parts at substantially equal angles around the rotating shaft.

In one embodiment, the volatile component outlet is provided in the bottom of the agitation vessel, a condenser is provided at the center of the agitation vessel, and a volatile component that has evaporated from the raw material liquid condenses on the condenser and is discharged via the volatile component outlet.

The present invention also provides an evaporation system comprising:

a raw material tank containing a raw material liquid;

the evaporation device described above, wherein the evaporation device is configured to process the raw material liquid supplied from the raw material tank; and a condenser configured to condense a volatile component discharged from the volatile component outlet of the evaporation device.

The present invention also provides an evaporation system comprising:

a raw material tank containing a raw material liquid; and the evaporation device described above, wherein the evaporation device being configured to process the raw material liquid supplied from the raw material tank.

Effects of the Invention

According to the present invention, the volatile component can be efficiently evaporated from the raw material liquid without using a part such as a roller or a wiper. Thus, an even more concentrated concentrate can be prepared from the raw material liquid. Furthermore, according to the present invention, the possibility of the occurrence of seizure of a part within the agitation vessel can be avoided.

MODES FOR CARRYING OUT THE INVENTION

An evaporation device of the present invention will be described with reference to the accompanying drawings.

Figure 1:
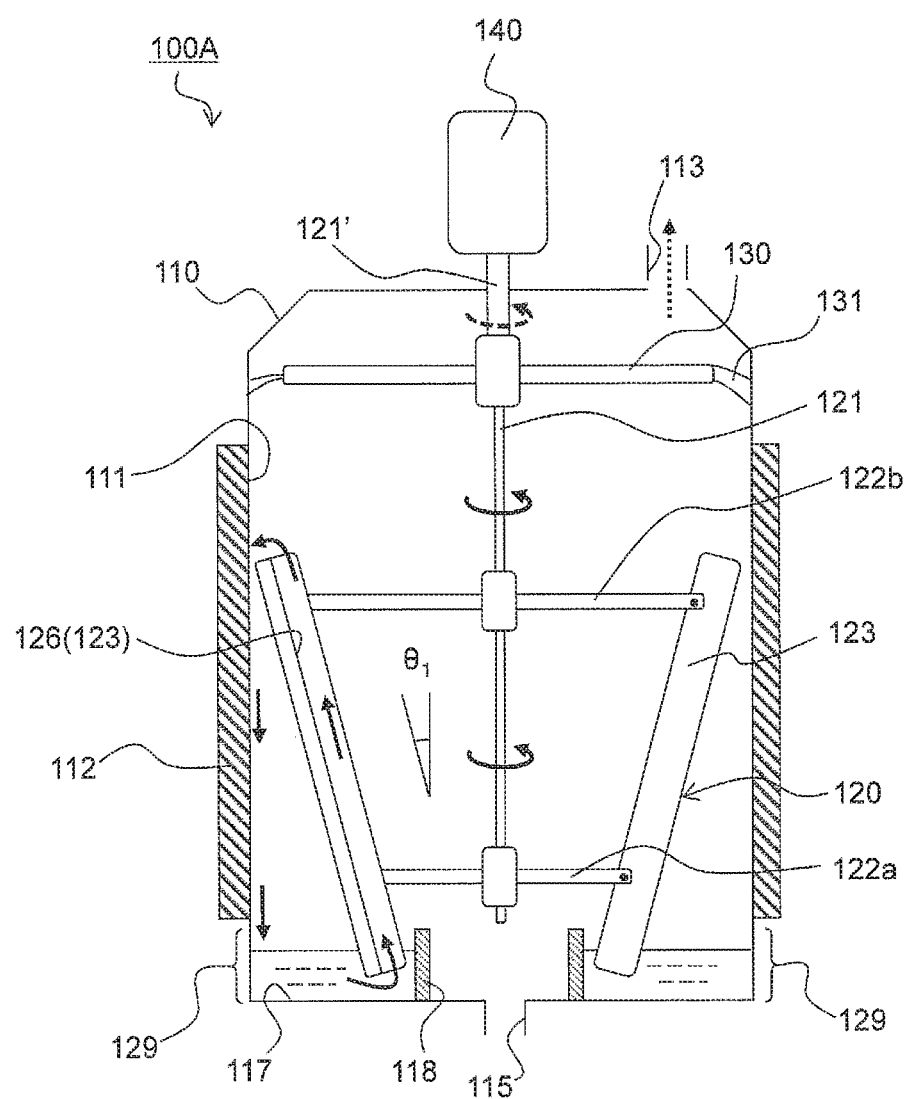
FIG. 1 is a schematic diagram showing an example of an evaporation device of the present invention.

FIG. 1 is a schematic diagram showing an example of the evaporation device of the present invention. An evaporation device 100A in FIG. 1 includes an agitation vessel 110 to which a raw material liquid is supplied, a jacket 112 that heats an inner wall 111 of the agitation vessel 110, and a liquid-distributing portion 120 that is provided within the agitation vessel 110 and that causes the raw material liquid to flow down the inner wall 111 of the agitation vessel 110.

The agitation vessel 110 is a hermetically sealable vessel which has a volatile component outlet 113 and a concentrate outlet 115 and in which a liquid, such as an aqueous solution or slurry, can be received and agitated. In FIG. 1, the volatile component outlet 113 is provided in a top portion of the agitation vessel 110, and a volatile component obtained by evaporation of a constituent component in the raw material liquid, which will be described later, can be discharged to the outside through the outlet 113. On the other hand, in FIG. 1, the concentrate outlet 115 is provided in a bottom, or preferably, at the center of the bottom of the agitation vessel 110, and a concentrate remaining after evaporation of a constituent component in the raw material liquid, which will be described later, can be discharged to the outside through the outlet 115.

The size (capacity) of the agitation vessel 110 can be set as appropriate in accordance with the specific use (type of raw material liquid to be used) of the evaporation device 100A the amount of raw material liquid to be processed, and the like, and is therefore not necessarily limited, but may be 0.1 liters to 100,000 liters, for example. The material composing the agitation vessel 110 is not especially limited; however, it is preferable that the agitation vessel 110 is composed of a metal, such as iron, stainless steel, titanium, Hastelloy, or copper. Because, for example, these metals are stable to various types of raw material liquids, have excellent thermal conductivity, and can be easily obtained and processed. A coating that is known in the art, such as Teflon (registered trademark), a glass lining, or a rubber lining, may be applied to the inner wall of the agitation vessel 110 in order to increase the chemical resistance.

The agitation vessel 110 is provided with the jacket 112 for heating the inner wall 111. The jacket 112 is disposed so as to cover the entirety of the inner wall 111 from a lateral surface portion of the agitation vessel 110, for example. Alternatively, the portion covered by the jacket 112 may extend from the bottom of the agitation vessel 110 to a lateral surface portion of the inner wall 111. The shape and type of the jacket 112 are not especially limited as long as the jacket 12 can heat the inner wall 111 to a temperature that evaporates the raw material liquid applied to the inner wall 111. For example, a jacket capable of introducing steam or a heating medium can be used as the jacket 112. Such a jacket may further be used in combination with a heat source such as a cable-shaped heater.

In the evaporation device 100A shown in FIG. 1, the agitation vessel 110 also includes a storage portion 117 for temporarily storing the raw material liquid that has flowed down from the inner wall 111. In FIG. 1, the storage portion 117 is a region that can be formed by being surrounded by the bottom of the agitation vessel 110, the inner wall 111, and a partition wall portion 118, that is, a region 129 surrounded by a portion of the bottom of the agitation vessel 110, a portion of the inner wall 111, and the partition wall portion 118 and corresponding to the volume of the raw material liquid that can be stored therein. Since the storage portion 117 is open at the top, when the liquid level of the raw material liquid that has flowed down from the inner wall 111 exceeds the height of the partition wall portion 118, the raw material liquid overflows, and the overflowing raw material liquid can be discharged to the outside as a concentrate through the concentrate outlet 115. Thus, in the embodiment shown in FIG. 1, the partition wall portion 118 is provided around the concentrate outlet 115, which is provided in the bottom of the agitation vessel 110.

In the evaporation device 100A shown in FIG. 1, the top portion of the agitation vessel 110 may also have an openable structure, such as a lid or a maintenance hole, for example.

The liquid-distributing portion 120 for distributing the raw material liquid received in the storage portion 117 over the inner wall 111 of the agitation vessel 110 is provided inside the agitation vessel 110. The liquid-distributing portion 120 is constituted by a rotating shaft 121 and a channel part 123 mounted to the rotating shaft 121. When the rotating shaft 121 rotates, the liquid-distributing portion 120 can cause the raw material liquid received in the storage portion 117 to flow upward from a lower portion of the agitation vessel 110 through a flow passage 126 provided along the length direction of the channel part 123, and distribute the raw material liquid that has been drawn up from the storage portion 117 in this manner toward the inner wall 111 of the agitation vessel 110. As a result, the distributed raw material liquid flows down on the heated inner wall 110 again and forms a wet surface on the inner wall 110, and meanwhile, the evaporation of the volatile component can be promoted.

The rotating shaft 121 is a shaft composed of a rigid metal, such as iron, stainless steel, Hastelloy, or titanium, and has a cylindrical tube shape or a cylindrical shape, for example. In the agitation vessel 110, the rotating shaft 121 usually is vertically disposed. The thickness of the rotating shaft 121 is not necessarily limited, but may be 8 mm to 200 mm, for example. The length of the rotating shaft 121 varies in accordance with the size and the like of the agitation vessel 110 to be used, and a person skilled in the art can select an appropriate length.

One end of the rotating shaft 121 is connected to a rotating means such as a motor 140 above the agitation vessel 110. In FIG. 1, the other end of the rotating shaft 121 is not connected to the bottom of the agitation vessel 110 and is disposed at a position spaced apart from the bottom of the agitation vessel 110 by a certain distance.

In the evaporation device 100A shown in FIG. 1, two channel parts 123 are arranged around the axis of the rotating shaft 121, which constitutes the liquid-distributing portion 120, the two channel parts 123 being symmetrically arranged with respect to the rotating shaft 121. The two channel parts 123 are fixed to the rotating shaft 123 by two attachment parts 122a and 122b that are oriented in a direction perpendicular to the rotating shaft 121. Moreover, in FIG. 1, the attachment part 122a is shorter than the attachment part 122b that is provided on the upper side, and the two channel parts 123 are attached to the attachment parts 122a and 122b so as to be inclined upward to the inner wall 110 side at a predetermined angle (also referred to as the angle of inclination of attachment) θ1 relative to the rotating shaft 121 located at the center. The angle of inclination of attachment $\theta_1$ may be 1.5° to 60°, for example. Furthermore, in the agitation vessel 110, each channel part 123 is disposed at a position in which one end portion thereof is inserted in the storage portion 117.

In the evaporation device of the present invention, for example, a plurality of (i.e., one or more), preferably two to eight, and more preferably two to six channel parts are mounted to the rotating shaft. In the present invention, it is preferable that these channels parts are mounted substantially equiangularly spaced around the rotating shaft.

Figure 2:
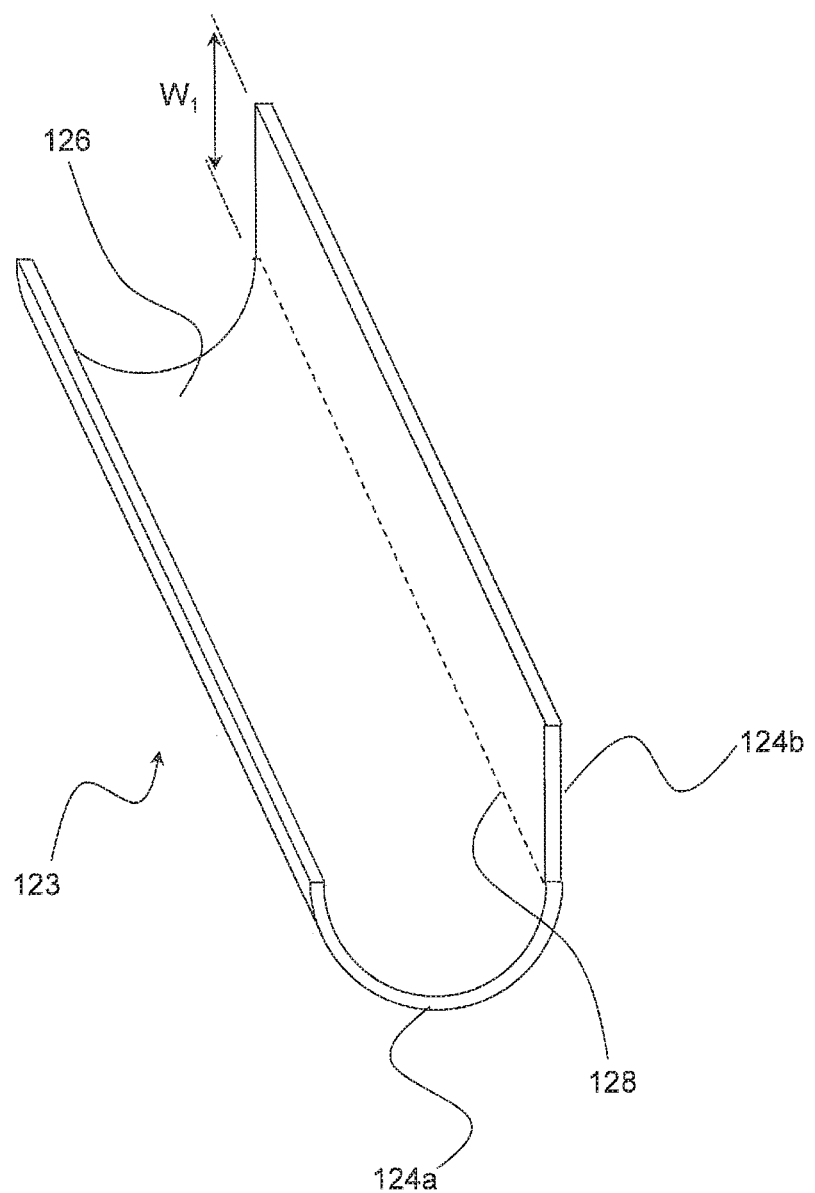
FIG. 2 is a perspective view schematically showing an example of a channel part that may be used for a liquid-distributing portion constituting the evaporation device of the present invention.

In one embodiment of the present invention, each channel part 123 may have the flow passage 126 which is in the form of a so-called half-pipe having a semicylindrical tube shape, a semirectangular tube shape, a V-shape, or the like, for example. Alternatively, the channel part 123 may have a configuration in which, for example, a lower end and an upper end thereof have the above-described half-pipe form, and an intermediate portion therebetween is processed into a tube shape (e.g., a cylindrical tube shape or a rectangular tube shape). Alternatively, the channel part 123 may include a flat portion 124b that is coupled to one longitudinal end portion of a channel forming portion 124a via a coupling portion 128, as shown in FIG. 2, or that is formed by one longitudinal end portion of the channel forming portion 124 extending along the longitudinal direction. It should be noted that the term "coupling portion" as used herein is a boundary portion between the flat portion and the channel forming portion, and, for example, refers to both of a portion at which an independent flat portion and a channel forming portion are joined to each other and, in the case where the flat portion and the channel forming portion are constituted by a continuous part, a portion at which the flat surface state of the flat portion is lost. In the case where the channel part 123 shown in FIG. 2 is used, due to the rotation of the rotating shaft, the liquid is drawn up from the left side in FIG. 2 at the lower end of the channel part 123 and the liquid moves upward to the upper end of the channel part 123 through this rotation. When moving upward, the liquid that has been drawn up is blocked by the flat portion 124b in spite of the rotation of the channel part 123 and thus can be prevented from flying out from the channel part 123.

The size of the channel part 123 is not especially limited; however, in the case where a channel part having, for example, a semicylindrical tube shape is used, the diameter of the semicylindrical tube portion may be 2 mm to 200 mm, for example. The length of the channel part from the lower end to the upper end may be 40 mm to 8,000 mm, for example. In the case where the channel part includes a flat portion such as that shown in FIG. 2, the width W1 of the flat portion is not necessarily limited, but may be 20 mm to 300 mm, for example. The channel part 123 is composed of, for example, a metal such as iron, stainless steel, Hastelloy, or titanium or a material constituted by a combination of these metals.

Furthermore, in the present invention, a barrier part (not shown), such as a baffle plate or a short-shaft pin, may also be provided on a portion of the bottom and/or the inner wall 111 constituting the storage portion 117. When the raw material liquid temporarily stored in the storage portion 117 is drawn up by the channel part 123 through the rotation of the rotating shaft 121, a vortex flow in the forward direction of the rotation direction of the rotating shaft 121 may be generated in the storage portion 117. There is concern that the vortex flow of the raw material liquid may decrease the efficiency at which the channel part 123 draws up the raw material liquid. The barrier part serves to suppress or prevent the generation of such a vortex flow by coming into contact with the raw material liquid in the storage portion 117. The shape and material of the barrier part can be freely selected by a person skilled in the art, and the barrier part can be attached to a position, on a portion of the inner wall 111 that constitutes the storage portion 117 and/or an interior bottom surface of the storage portion 117, at which the barrier part does not obstruct the movement of the channel part 123.

Referring again to FIG. 1, in an upper portion of the agitation vessel 110 shown in FIG. 1, a second rotating shaft 121' is provided around the rotating shaft 121. Furthermore, a supply pipe 130 including a raw material liquid supply port 131 is attached to the second rotating shaft 121'. The raw material liquid that has been supplied from a raw material tank (not shown) that is attached outside the agitation vessel 110 can be supplied to the inner wall 111 of the agitation vessel 110 through the rotation of the second rotating shaft 121', and thus the raw material liquid can be caused to flow down along the inner wall 111, thereby forming a wet surface. It should be noted that in the evaporation device 100A shown in FIG. 1, the rotating shaft 121 and the second rotating shaft 121' may be independent of each other, for example, so that the rotating shaft 121 and the second rotating shaft 121' individually rotate at different rotation speeds in the agitation vessel 110, or the rotating shaft 121 and the second rotating shaft 121' may be coupled to each other and rotate at the same rotation speed.

In the evaporation device 100A of the present invention, the rotation rate (i.e., rotation rate of the liquid-distributing portion 120) of the rotating shaft 121 that is suitable for drawing up the liquid within the agitation vessel 110 varies in accordance with the viscosity of the liquid, the size of the agitation vessel 110, the amount of liquid remaining in the agitation vessel 110, and the like and is therefore not necessarily limited, but may be 30 rpm to 500 rpmm, for example.

In the evaporation device 100A shown in FIG. 1, the raw material liquid supplied from the raw material liquid supply port 131 flows down the inner wall 111 of the agitation vessel 110, and meanwhile, the volatile component is evaporated by heat that is applied to the inner wall 111 by the jacket 112, and discharged through the volatile component outlet 113. On the other hand, an component that did not volatilize, of the raw material liquid flows down the inner wall 111 as is, and is received in the storage portion 117.

Furthermore, in the present invention, the liquid-distributing portion 120 is rotated by rotating means such as the motor 140, and the centrifugal force generated by the rotation is used to draw up the raw material liquid received in the storage portion 117 of the agitation vessel 110 from the lower end of the channel part 123, move the raw material liquid upward through the flow passage 126 of the channel part 123, and distribute the raw material liquid from the upper end side of the channel part 123 toward the inner wall 111 of the agitation vessel 110. The distributed raw material liquid strikes the inner wall 111 of the agitation vessel 110 and flows down the inner wall 111 again. Meanwhile, the volatile component of the distributed raw material liquid is evaporated by the heat that is applied to the inner wall 111 by the jacket 112, and moves to the above-described volatile component outlet 113. On the other hand, a large portion of the raw material liquid flowing down the inner wall 111 is received in the storage portion 117 again.

As described above, in the present invention, the evaporation of the volatile component while the raw material liquid flows down the inner wall 111, the reception of the remaining component into the storage portion 117, the transfer of the raw material liquid from the storage portion 117 to the inner wall 111 by the liquid-distributing portion 120, and the flowing-down of the raw material liquid from the liquid-distributing portion 120 along the inner wall 111 are sequentially performed, and thus, the raw material liquid circulates among these parts and is gradually concentrated as a result of the volatile component evaporating during the circulation. On the other hand, with the raw material liquid newly flowing down from the raw material supply port 131 being added, the liquid level in the storage portion 117 gradually rises. Afterward, when the liquid level exceeds the partition wall portion 118 of the storage portion 117, the raw material liquid received in the storage portion 117 overflows and is discharged to the outside as a concentrate through the concentrate outlet 115.

According to the evaporation device of the present invention, when the operation thereof is to be stopped, the raw material liquid can be circulated as long as the raw material liquid is present in the agitation vessel, and thus, seizure of the inner wall of the agitation vessel can be avoided by performing the circulation until the temperature of the inner wall has decreased to some extent. In this respect, compared with a conventional evaporation device in which a raw material liquid passes down the inner wall in the agitation vessel by flowing down only once through "one path", the undesired amount of raw material liquid that is used during cooling of the agitation vessel can be reduced.

According to the present invention, at an upper end portion of the channel part with respect to the direction in which the liquid flows, the amount of splashes generated by the raw material liquid striking the inner wall can be reduced within the agitation vessel. Here, the wording "the amount of splashes generated by the raw material liquid striking the inner wall can be reduced within the agitation vessel" as used herein encompasses both a reduction in the substantial amount of splashes diffusing in the agitation vessel by suppressing, when distributing the drawn-up raw material liquid from the channel part over the inner wall of the agitation vessel, the generation itself of splashes due to the raw material liquid striking the inner wall, and a reduction in the substantial amount of splashes diffusing in the agitation vessel by collecting the splashes that have been generated as a result of the raw material liquid striking the inner wall during the distribution over the inner wall of the agitation vessel, before the splashes diffuse in the agitation vessel. In the present invention, this can be achieved by providing a splash-preventing part at the upper end portion of the channel part with respect to the direction in which the raw material liquid flows.

Figure 3:
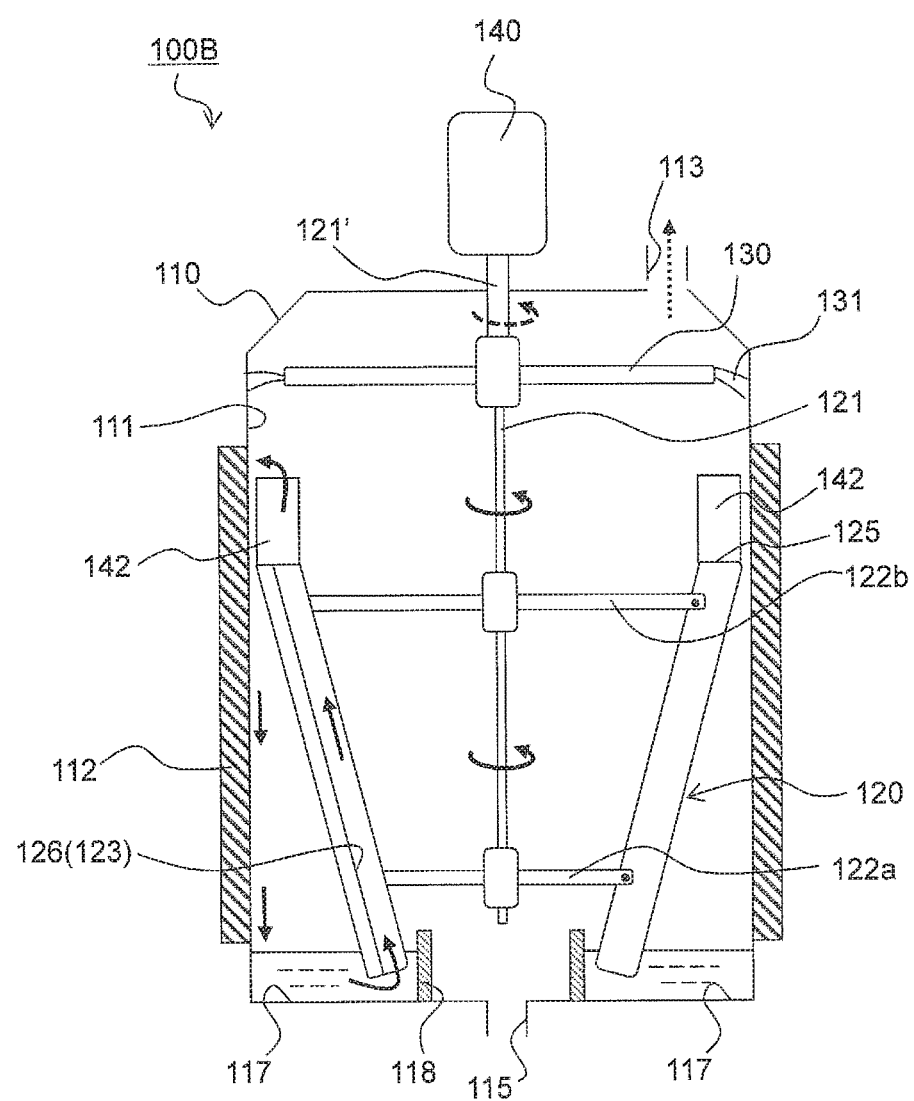
FIG. 3 is a schematic diagram showing another example of the evaporation device of the present invention.

FIG. 3 is a schematic diagram showing another example of the evaporation device of the present invention.

In an evaporation device 100B shown in FIG. 3, constituent elements denoted by the same reference numerals as those shown in the above-described drawings are the same as those shown in the above-described drawings.

The evaporation device 100B of the present invention shown in FIG. 3 includes a mist separator 142 serving as the splash-preventing part, the mist separator 142 extending from a leading end portion of each channel part 123 with respect to the direction in which the liquid flows. With the mist separator 142, the raw material liquid that has been drawn up from the lower end to the upper end of the channel part 123 through the flow passage 126 of the channel part 123 can be distributed from a leading end portion of the mist separator 140 toward the inner wall 111 of the agitation vessel 110. Here, in the embodiment shown in FIG. 3, the mist separator 142 is bent at a joint portion 125 from the axial direction of the channel part 123 (e.g., so as to extend in a direction that is substantially parallel to the inner wall 111), and thus, the raw material liquid is discharged from the leading end portion of the mist separator 142 in the direction that is substantially parallel to the inner wall 111 (i.e., upward in the agitation vessel 110). The discharge is performed by the momentum of the liquid drawn up from the channel part 123 being reduced after the liquid has passed the joint portion 125. As a result, the discharged raw material liquid does not fly out upward in the agitation vessel 110, and the raw material liquid can be gently supplied from the leading end portion of the mist separator 142 toward the inner wall 111. Thus, the raw material liquid is restrained from violently striking the inner wall 111, and the amount of splashes generated by the raw material liquid bouncing off the inner wall 111 can be reduced.

It should be noted that in the present embodiment, the wording "direction that is substantially parallel to the inner wall 111" encompasses not only a direction in which the axis constituting the flow passage 126 is parallel to a plane constituting the inner wall 111 but also a case where the axis constituting the flow passage 126 is inclined relative to the plane constituting the inner wall 111 at an angle within, for example, a range of −5° to +5°, and preferably within a range of −3° to +3°.

Furthermore, it is preferable that the mist separator 142 and the inner wall 111 are spaced apart from each other by an appropriate distance that is enough to prevent contact therebetween. The distance between the mist separator 142 and the inner wall 111 at a portion where the mist separator 142 and the inner wall 111 are closest to each other may be 5 mm to 200 mm, for example. If the distance at this closest portion is smaller than 5 mm, it is likely that, during the rotation, if the rotating shaft is slightly distorted, the leading end portion of the mist separator 142 may come into contact with the inner wall 111, and the inner wall 111 and the mist separator 142 may be damaged.

It should be noted that, although an example in which the mist separator 142 is bent at the joint portion 125 relative to the channel part 123 is shown in FIG. 3, the present invention is not limited only to such a form. The mist separator 142 may also be curved around the joint portion with any curvature, instead of being bent.

In the present invention, the length (length from the joint portion 125 to the leading end portion) of the mist separator 142 varies in accordance with various conditions including the rotation speed of the rotating shaft 121, the angle of inclination of attachment $\theta_1$, length, and width of the channel part 123, the type and viscosity of the liquid, and the like and is therefore not necessarily limited, but may be 10 mm to 200 mm, for example. Furthermore, for example, in the case where a semicylindrical tube-shaped flow passage is adopted, the diameter of the semicylindrical tube portion may be 10 mm to 250 mm, for example. A mist separator that is well known in the art may be used as the mist separator 142.

Figure 4:
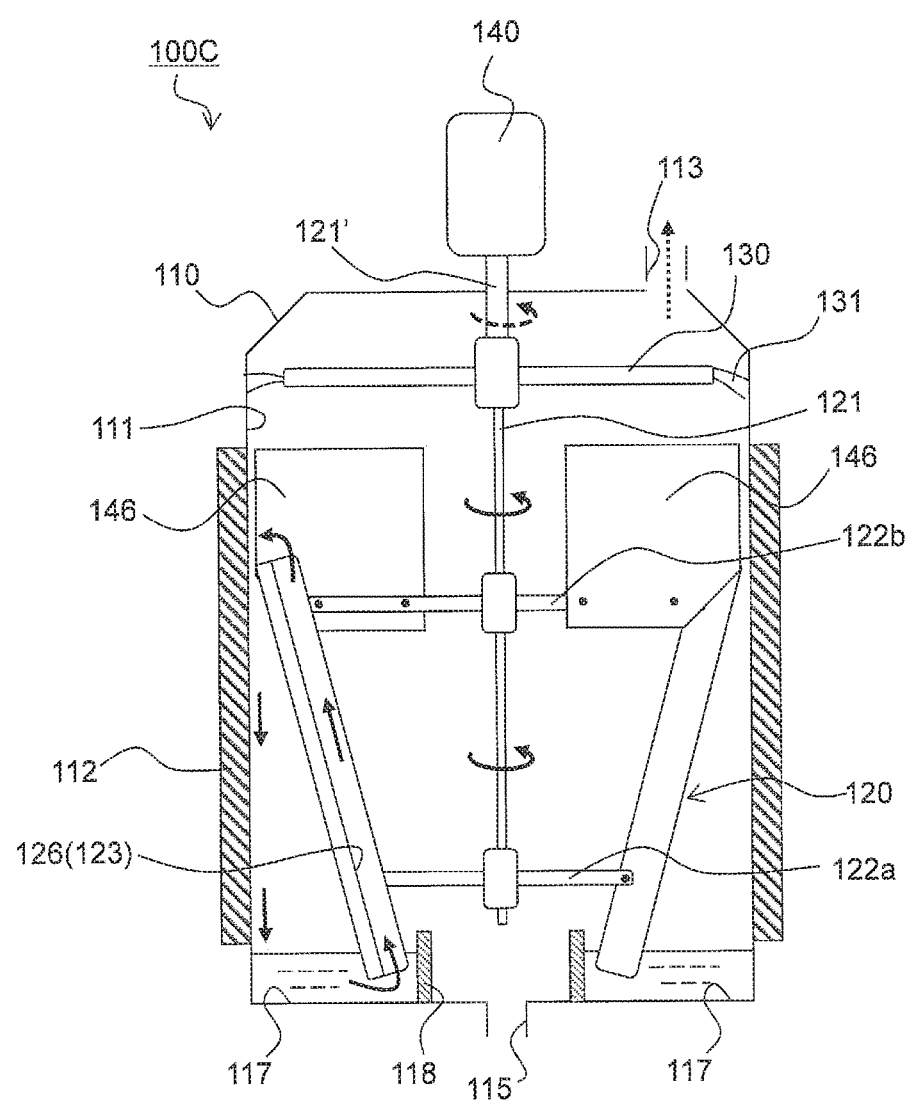
FIG. 4 is a schematic diagram showing yet another example of the evaporation device of the present invention.

FIG. 4 is a schematic diagram showing yet another example of the evaporation device of the present invention.

In an evaporation device 100C shown in FIG. 4, constituent elements denoted by the same reference numerals as those shown in the above-described drawings are the same as those shown in the above-described drawings.

In an evaporation device 100C of the present invention shown in FIG. 4, the splash-preventing part includes a part for collecting splashes that are generated by the liquid striking the inner wall, and specifically includes a plate-like part 146, which will be described below.

In FIG. 4, in the vicinity of the upper end portion of the flow passage 126 of each channel part 123, the plate-like part 146 is provided extending along the channel part 123 on the rear side of the channel part 123 with respect to the rotation direction of the channel part 123. The plate-like part 146 shown in FIG. 4 has a pentagonal shape formed by cutting away one vertex portion of a rectangular shape, and extends in the radial direction of the rotating shaft 121 from the rear of the upper end portion of the channel part 123 to near the rotating shaft 121.

In the present invention, the size and thickness of the plate-like part 146 are not especially limited, and it is preferable that the plate-like part 146 is composed of a material that is rigid enough to withstand the rotation of the rotating shaft 121. Examples of the material composing the plate-like part 146 include metals, such as iron, stainless steel, Hastelloy, and titanium, and combinations of these metals.

Figure 5:
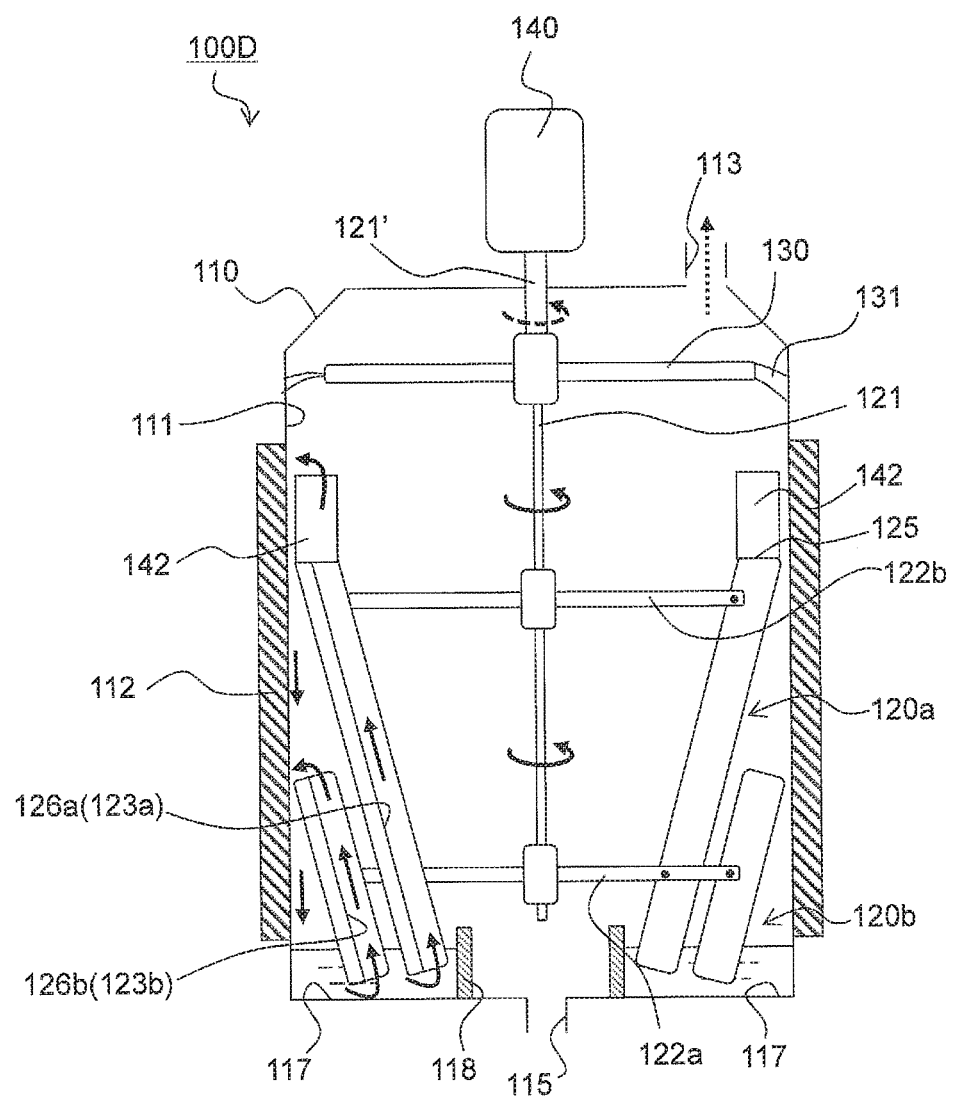
FIG. 5 is a schematic diagram showing yet another example of the evaporation device of the present invention.

FIG. 5 is a schematic diagram showing yet another example of the evaporation device of the present invention.

In an evaporation device 100D shown in FIG. 5, constituent elements denoted by the same reference numerals as those shown in the above-described drawings are the same as those shown in the above-described drawings.

The evaporation device 100D shown in FIG. 5 includes two types of liquid-distributing portions 120a and 120b within the agitation vessel 110. In FIG. 5, a pair of first channel parts 123a is attached to the attachment parts 122a and 122b. A lower end of each of the first channel parts 123a extends to a position at which it can be inserted into the raw material liquid received in the storage portion 117, and the splash-preventing part such as the mist separator 142 is attached to an upper end of the first channel part 123a, if necessary, via the connecting portion 125. Also, the first channel parts 123a are provided so as to be axially symmetric with respect to the rotating shaft 121. Furthermore, a pair of second channel parts 123b is attached to the attachment part 122a, on the outward side of the above-described pair of first channel parts 123a. A lower end of each of the second channel parts 123b also extends to a position at which it can be inserted into the raw material liquid received in the storage portion 117.

As described above, in the embodiment shown in FIG. 5, with the first channel parts 123a and the second channel parts 123b provided outward of the first channel parts 123a, the raw material liquid received in the storage portion 117 can be drawn up by the individual parts 123a and 123b, so that the amount of raw material liquid flowing down the inner wall 111 of the agitation vessel 110 can be increased. Thus, the amount of volatile component evaporated from the raw material liquid at the inner wall 111 also increases, so that the evaporation of the volatile component and the preparation of the concentrate overflowing from the storage portion 117 can be more efficiently performed. It should be noted that in the evaporation device shown in FIG. 5, for example, a plurality (i.e., one or more) of preferably two to eight, and more preferably two to six of the second channel parts may be mounted to the rotating shaft. In the present invention, it is preferable that these second channel parts are mounted substantially equiangularly spaced around the rotating shaft.

Figure 6:
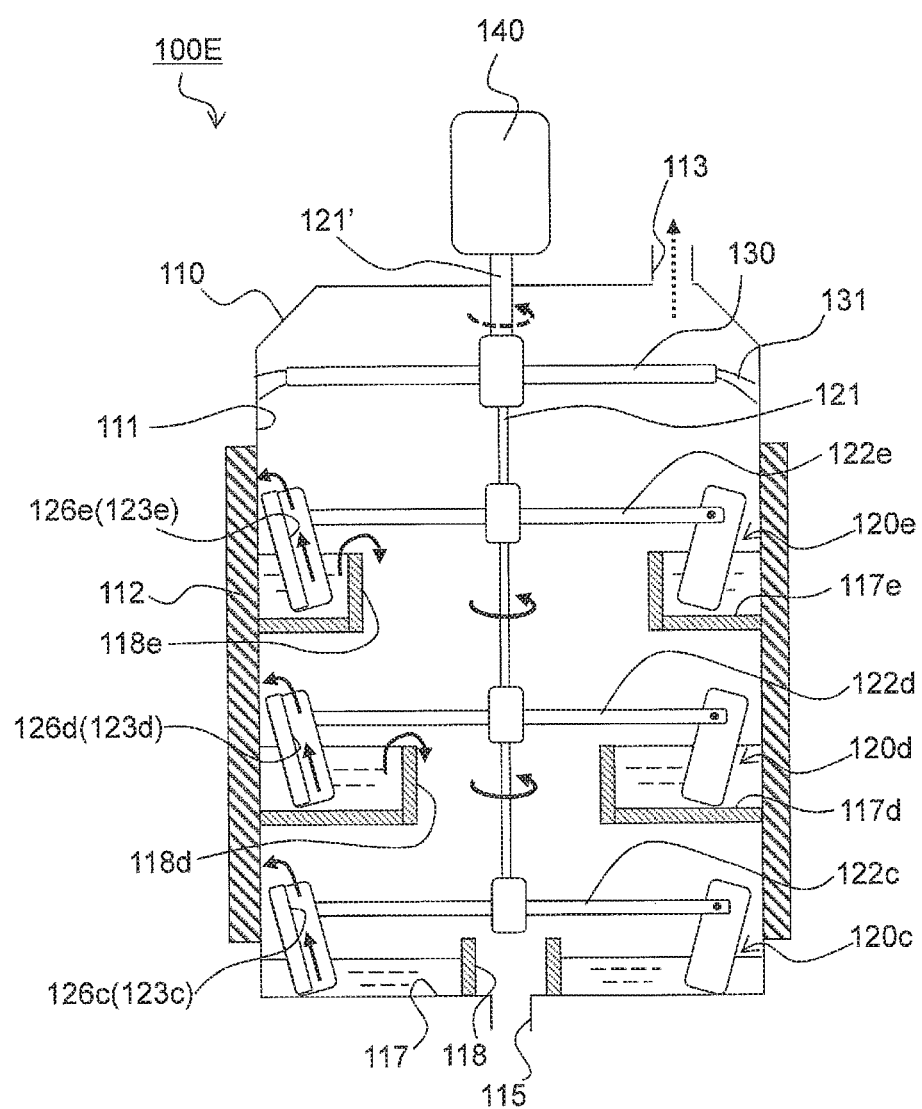
FIG. 6 is a schematic diagram showing yet another example of the evaporation device of the present invention.

FIG. 6 is a schematic diagram showing yet another example of the evaporation device of the present invention.

In an evaporation device 100E shown in FIG. 6, constituent elements denoted by the same reference numerals as those shown in the above-described drawings are the same as those shown in the above-described drawings.

The evaporation device 100E shown in FIG. 6 includes liquid-distributing portions 120c, 120d, and 120e that are arranged in three levels in an up-down direction within the agitation vessel 110. Furthermore, the evaporation device 100E is provided with, in addition to the storage portion 117 provided on the bottom of the agitation vessel 110, a second storage portion 117d and a third storage portion 117e individually extending from respective intermediate portions of the inner wall 111. The second storage portion 117d and the third storage portion 117e also can receive raw material liquid flowing down from the inner wall 111 of the agitation vessel 110, and are both open at the top, and therefore, when the liquid level of the received raw material liquid rises and exceeds a partition wall portion 118d or 118e, the raw material liquid overflows and is received in another storage portion (storage portion 117 or second storage portion 117d) that is located in the level immediately below. The partition wall portion 118, the second partition wall portion 118d, and the third partition wall portion 118e are respectively provided at such positions that the horizontal distance from the concentrate outlet 115 that is provided substantially at the center of the agitation vessel 110 gradually decreases from the upper side toward the lower side of the agitation vessel 110 (i.e., in FIG. 6, in the order of the third partition wall portion 118e, the second partition wall portion 118d, and the partition wall portion 118).

Here, a pair of first channel parts 123c is provided on an attachment part 122c so as to be axially symmetric with respect to the rotating shaft 121, the attachment part 122c being provided at the lowest portion of the rotating shaft 121. Moreover, a lower end of each of the first channel parts 123c extends to a position at which it can be inserted into the raw material liquid received in the storage portion 117. A pair of second channel parts 123d is provided on an attachment part 122d so as to be axially symmetric with respect to the rotating shaft 121, the attachment part 122d being provided at a middle portion of the rotating shaft 121. Moreover, a lower end of each of the second channel parts 123d extends to a position at which it can be inserted into the raw material liquid received in the second storage portion 117d. A pair of third channel parts 123e is provided on an attachment part 122e so as to be axially symmetric with respect to the rotating shaft 121, the attachment part 122e being provided at the highest portion of the rotating shaft 121. Moreover, a lower end of each of the third channel parts 123e extends to a position at which it can be inserted into the raw material liquid received in the third storage portion 117e.

In the evaporation device 100E shown in FIG. 6, the raw material liquid discharged from the raw material liquid supply port 131 of the supply pipe 130 first flows down the inner wall 111 of the agitation vessel 110 while forming a wet surface, and is received in the third storage portion 117e. While the raw material liquid flows down, a portion of the volatile component contained in the raw material liquid evaporates and is discharged to the outside through the volatile component outlet 113.

Furthermore, due to the rotation of the rotating shaft 121, the raw material liquid received in the third storage portion 117e is drawn up from the lower end to the upper end of each of the third channel parts 123e through a flow passage 126e of that third channel part 123e, and is then distributed over and flows down the inner wall 111 from an upper end portion of the third channel part 123e. While the raw material liquid flows down, the volatile component contained in the raw material liquid evaporates and is discharged to the outside from the volatile component outlet 113. The raw material liquid containing other components remaining therein is again received in the third storage portion 117e, and then, drawing-up by the third channel parts 123e is repeated.

Afterward, when the liquid level in the third storage portion 117e rises and exceeds the third partition wall portion 118e, the raw material liquid overflows and is received in the second storage portion 117d, which is located in the level immediately below.

The raw material liquid received in the second storage portion 117d is, due to the rotation of the rotating shaft 121, drawn up from the lower end to the upper end of each of the second channel parts 123d through a flow passage 126d of that channel part 123d, and is then distributed over and flows down the inner wall 111 from an upper end portion of the second channel part 123d. While the raw material liquid flows down, the volatile component contained in the raw material liquid evaporates and is discharged to the outside from the volatile component outlet 113. The raw material liquid containing the other components remaining therein is again received in the second storage portion 117d, and drawing-up by the second channel parts 123d is repeated.

Afterward, when the liquid level in the second storage portion 117d rises and exceeds the second partition wall portion 118d, the raw material liquid overflows and is received in the storage portion 117, which is located in the lowest level.

The raw material liquid received in the storage portion 117 is, due to the rotation of the rotating shaft 121, drawn up from the lower end to the upper end of each of the first channel parts 123c through a flow passage 126c of that first channel part 123c, and is then distributed over and flows down the inner wall 111 from an upper end portion of the first channel part 123c. While the raw material liquid flows down, the volatile component contained in the raw material liquid evaporates and is distributed to the outside from the volatile component outlet 113. The raw material liquid containing the other components remaining therein is again received in the storage portion 117, and drawing-up by the first channel parts 123c is repeated.

Afterward, when the liquid level in the storage portion 117 rises and exceeds the partition wall portion 118, the raw material liquid overflows and is discharged to the outside as a concentrate through the concentrate outlet 115.

In the embodiment shown in FIG. 6, the evaporation device 100E including the channel parts that are arranged in three levels has been described. However, the present invention is not limited to this. For example, an evaporation device constituted by channel parts that are arranged in two levels (e.g., an evaporation device obtained by eliminating the attachment part 122e, the third channel parts 120e, the third storage portion 117e, and the third partition wall portion 118e from the evaporation device shown in FIG. 6) is conceivable, or channel parts that are arranged in four or more levels may be provided. Furthermore, in the evaporation device shown in FIG. 6, the above-described second channel parts and third channel parts may be independently provided such that, for example, a plurality (i.e., one or more) of preferably two to eight, and more preferably two to six of the second or third channel parts are mounted to the rotating shaft. In the present embodiment, it is preferable that the second channel parts and the third channel parts are independently provided such that the second or third channel parts are mounted substantially equiangularly spaced around the rotating shaft.

With the evaporation device 100E shown in FIG. 6, since the storage portion 117, the second storage portion 117d, and the third storage portion 117e individually receive raw material liquid with different volatile component concentrations, the evaporation efficiency can be improved compared with a case where the concentration is performed by using a single storage portion.

Figure 7:
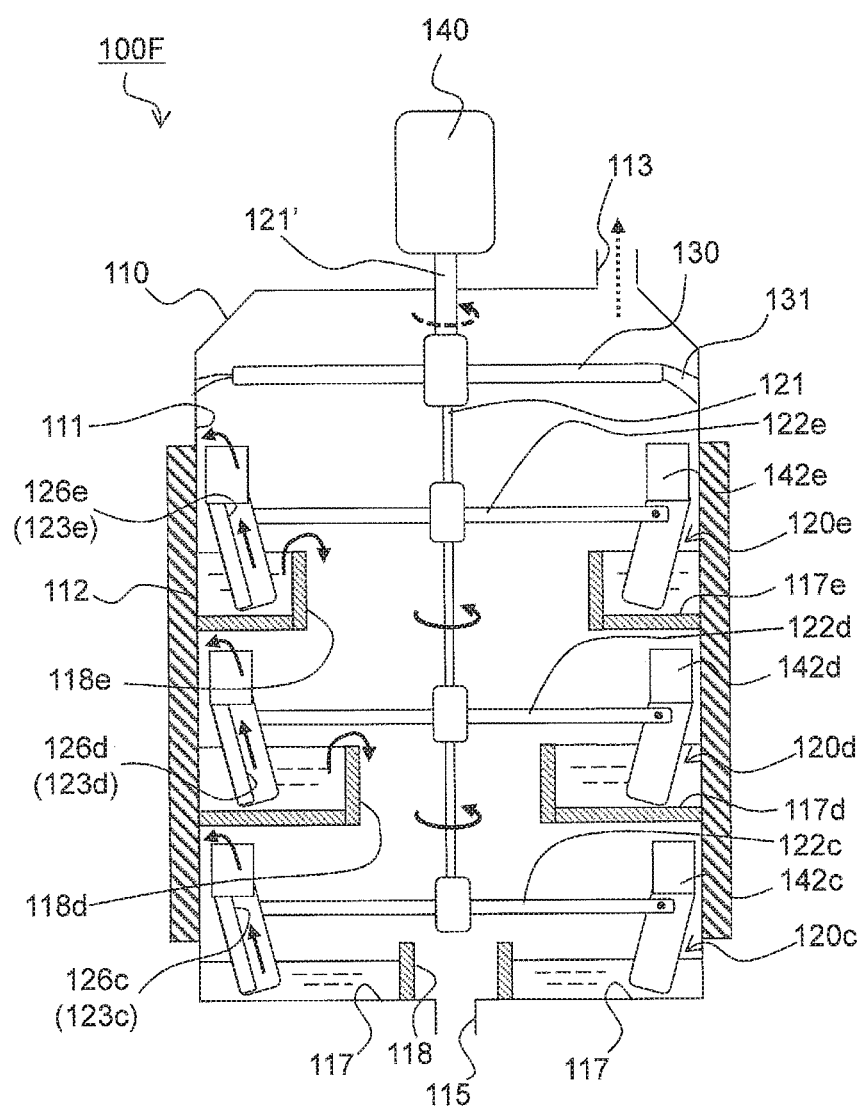
FIG. 7 is a schematic diagram showing yet another example of the evaporation device of the present invention.

FIG. 7 is a schematic diagram showing yet another example of the evaporation device of the present invention.

In an evaporation device 100F shown in FIG. 7, constituent elements denoted by the same reference numerals as those shown in the above-described drawings are the same as those shown in the above-described drawings.

The evaporation device 100F shown in FIG. 7 has a configuration in which mist separators 142c, 142d, and 142e are provided at the upper end portions of the first channel parts 123c, the second channel parts 123d, and the third channel parts 123e, respectively, of the evaporation device 100E shown in FIG. 6. With this configuration, the generation of splashes of the raw material liquid distributed from each of the first channel parts 123c, second channel parts 123d, and third channel parts 123e within the agitation vessel 110 can be prevented.

Figure 8:
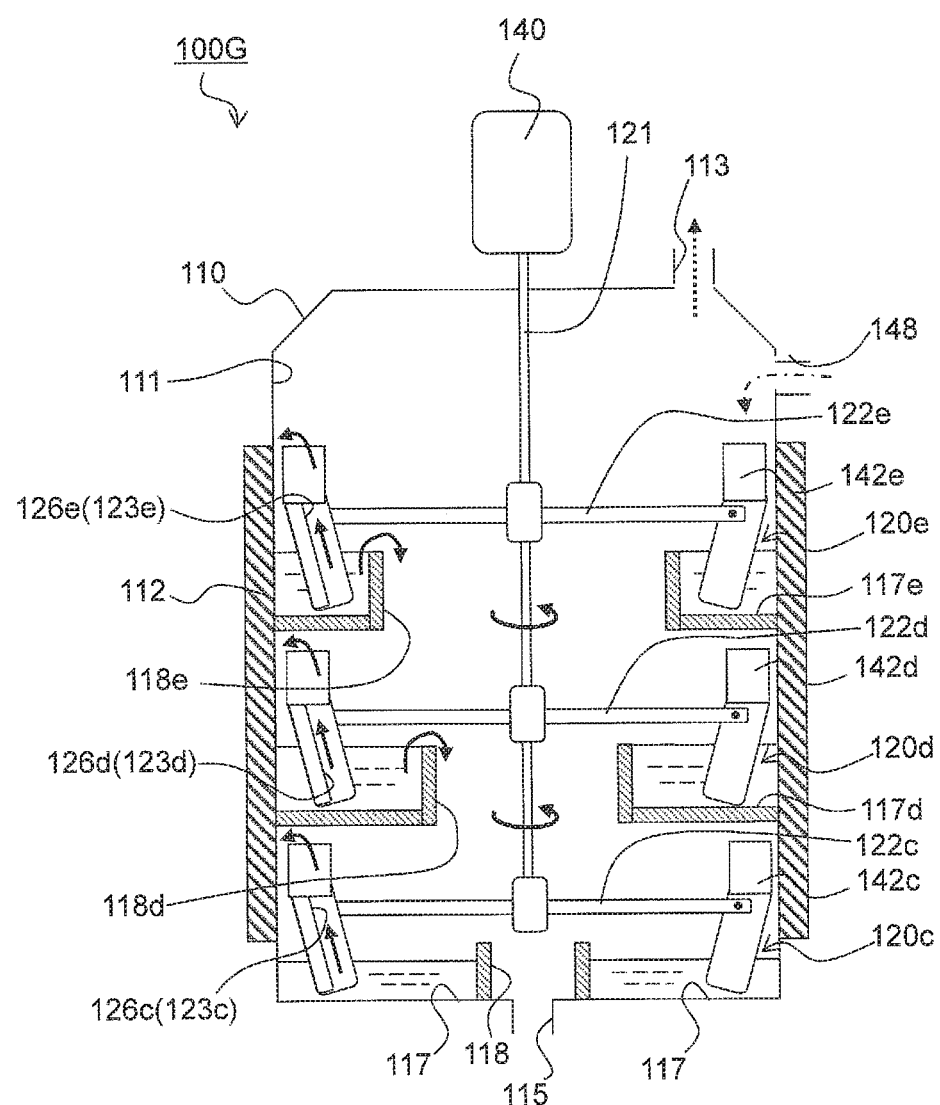
FIG. 8 is a schematic diagram showing yet another example of the evaporation device of the present invention.

FIG. 8 is a schematic diagram showing yet another example of the evaporation device of the present invention.

In an evaporation device 100G shown in FIG. 8, constituent elements denoted by the same reference numerals as those shown in the above-described drawings are the same as those shown in the above-described drawings.

The evaporation device 100G shown in FIG. 8 has a configuration in which, instead of the second rotating shaft 121' and the supply pipe 130 of the evaporation device 100F shown in FIG. 7, a raw material liquid supply port 148 that is in communication with the raw material tank (not shown), which is provided outside, is provided in an upper portion of the agitation vessel 110. In FIG. 8, the raw material liquid that has been supplied into the agitation vessel 110 through the raw material liquid supply port 148 flows down the inner wall 111 and is received in the third storage portion 117e.

With this configuration, the evaporation device 100G of the present invention can have a simpler structure without using a part, such as the second rotating shaft, that is separate from the rotating shaft 121.

Figure 9:
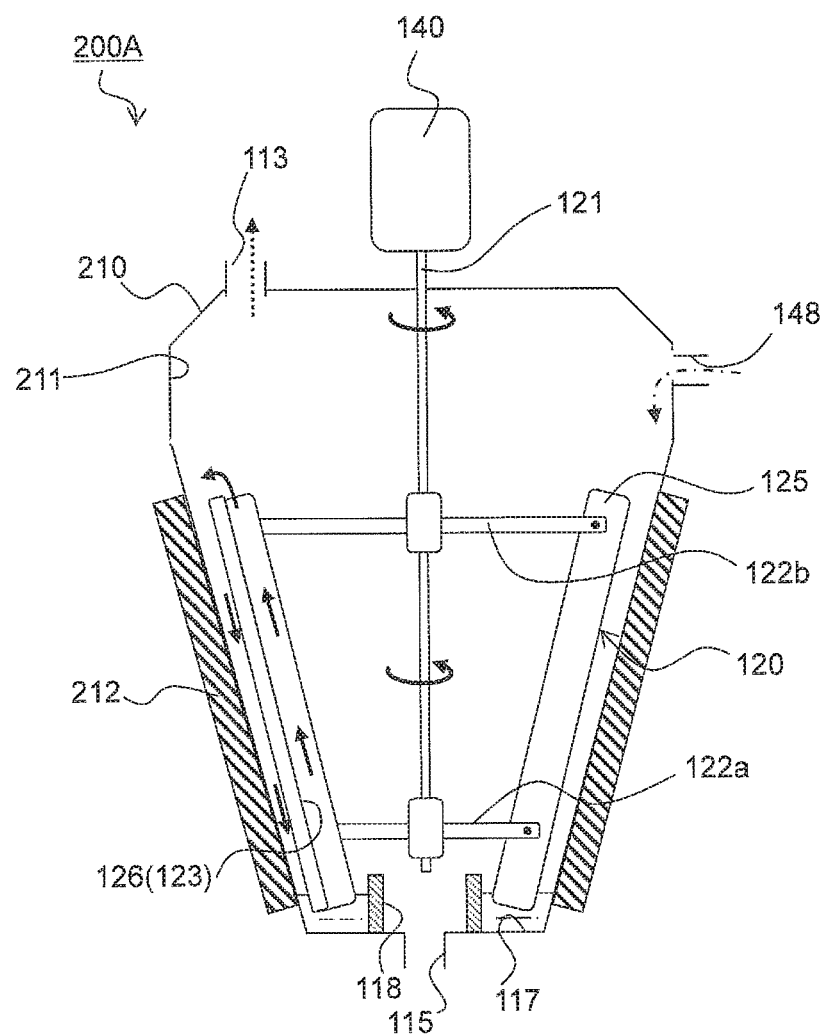
FIG. 9 is a schematic diagram showing yet another example of the evaporation device of the present invention.

FIG. 9 is a schematic diagram showing yet another example of the evaporation device of the present invention.

In an evaporation device 200A shown in FIG. 9, constituent elements denoted by the same reference numerals as those shown in the above-described drawings are the same as those shown in the above-described drawings.

The evaporation device 200A shown in FIG. 9 has a configuration in which, instead of the second rotating shaft 121' and the supply pipe 130 of the evaporation device 100F shown in FIG. 7, the raw material liquid supply port 148 that is in communication with the raw material tank (not shown), which is provided outside, is provided in the upper portion of the agitation vessel 110. Furthermore, the evaporation device 200A includes an agitation vessel 210 whose diameter decreases from the upper side toward the lower side. Furthermore, a jacket 212 is provided on a lateral surface portion of the agitation vessel 210 along this diameter-decreasing form.

The raw material liquid that has been supplied from the raw material liquid supply port 148 flows down along an inner wall 211 of the agitation vessel 210 to the storage portion 117 below, and meanwhile, the volatile component is evaporated through heating by the jacket 212 and is discharged to the outside via the volatile component outlet 113. On the other hand, the raw material liquid containing other components is received in the storage portion 117, moves upward from the lower side of the channel parts 123 again through the flow passages 126 of the channel parts 123 due to the rotation of the rotating shaft 121, and is then distributed over the inner wall 211. Thus, the evaporation of the volatile component contained in the raw material liquid is repeatedly performed.

On the other hand, when the liquid level in the storage portion 117 rises and exceeds the partition wall portion 118, the raw material liquid overflows and is discharged to the outside as a concentrate through the concentrate outlet 115.

Here, in the evaporation device 200A shown in FIG. 9, the lateral surface portion of the agitation vessel 210 is more gently inclined compared with an evaporation device such as that shown in FIG. 1, for example. This inclination increases the distance over which the raw material liquid flowing down the inner wall 211 passes, and thus, the evaporation of the volatile component can be more effectively performed. In particular, the evaporation device 200A shown in FIG. 9 can be effectively used even in the case where, for example, a raw material liquid having a relatively low viscosity is used.

Figure 10:
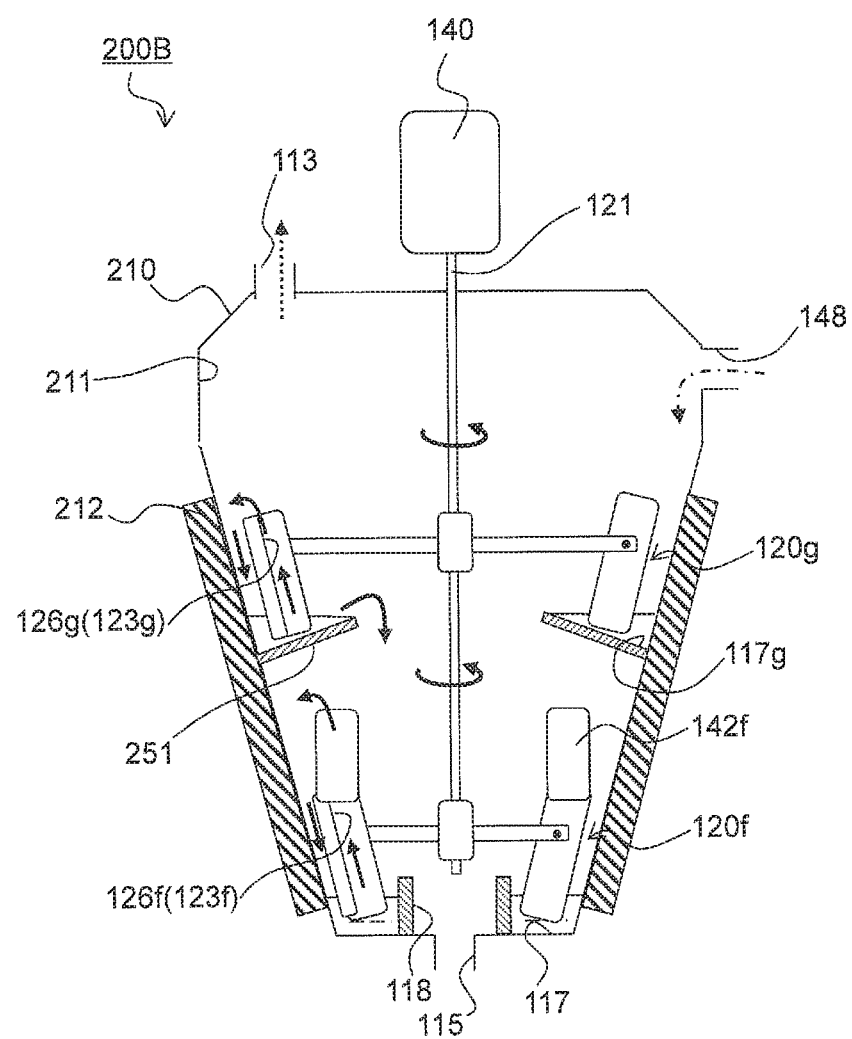
FIG. 10 is a schematic diagram showing yet another example of the evaporation device of the present invention.

FIG. 10 is a schematic diagram showing yet another example of the evaporation device of the present invention.

In an evaporation device 200B shown in FIG. 10, constituent elements denoted by the same reference numerals as those shown in the above-described drawings are the same as those shown in the above-described drawings.

The evaporation device 200B shown in FIG. 10 includes liquid-distributing portions 120f and 120g that are arranged in two levels in the up-down direction within the agitation vessel 210 (having an inverted conical shape, for example) whose diameter decreases from the upper side toward the lower side. A mist separator 142f is provided at an upper end portion of each of first channel parts 123f of the liquid-distributing portion 120f which is located in the lower level, of these liquid-distributing portions 120f and 120g. Furthermore, in the evaporation device 200B, in addition to the storage portion 117 provided on the bottom of the agitation vessel 210, a second storage portion 117g extending from an intermediate portion of the inner wall 211 is provided. The second storage portion 117g also is capable of receiving the raw material liquid flowing down from the inner wall 211 of the agitation vessel 210.

Here, in the evaporation device 200B shown in FIG. 10, the second storage portion 117g is constituted by a flat plate-like part 251 extending along the inclined inner wall so as to be substantially perpendicular thereto. With this configuration, the second storage portion 117g can receive a predetermined amount of raw material liquid without the need to separately provide a partition wall portion.

In the evaporation device 200B shown in FIG. 10, the raw material liquid that has been supplied from the raw material liquid supply port 148 flows down the inner wall 211 of the agitation vessel 210, and meanwhile, the volatile component evaporates and is discharged to the outside via the volatile component outlet 113. The raw material liquid containing other components is then received in the second storage portion 117g. Due to the rotation of the rotating shaft 121, second channel parts 123g draw up the raw material liquid received in the second storage portion 117g from the lower side to the upper side through respective flow passages 126g, and distribute the raw material liquid over the inner wall 211. Subsequently, the raw material liquid flows down the inner wall 211 again, and the volatile component is further evaporated. Then, the raw material liquid is received in the second storage portion 117g again, and drawing-up by the second channel parts 123g is repeatedly performed.

Afterward, when the liquid level in the second storage portion 117g rises, the raw material liquid overflows and is received in the storage portion 117, which is located in the lower level. In the same manner as described above, due to the rotation of the rotating shaft 121, the first channel parts 123f draw up the raw material liquid received in the storage portion 117 from the lower side to the upper side through respective flow passages 126f and distribute the raw material liquid over the inner wall 211. Subsequently, the raw material liquid flows down the inner wall 211 again, and the volatile component is further evaporated. Then, the raw material liquid is received in the storage portion 117 again, and drawing-up by the first channel parts 123f is repeatedly performed.

Afterward, when the liquid level in the storage portion 117 rises and exceeds the partition wall portion 118, the raw material liquid overflows and is discharged to the outside as a concentrate through the concentrate outlet 115.

Evaporation devices such as those shown in FIGS. 1 and 3 to 10 described above are also called thin film evaporation devices, and can be incorporated and used in place of an evaporation device of a conventional evaporation system.

Figure 11:
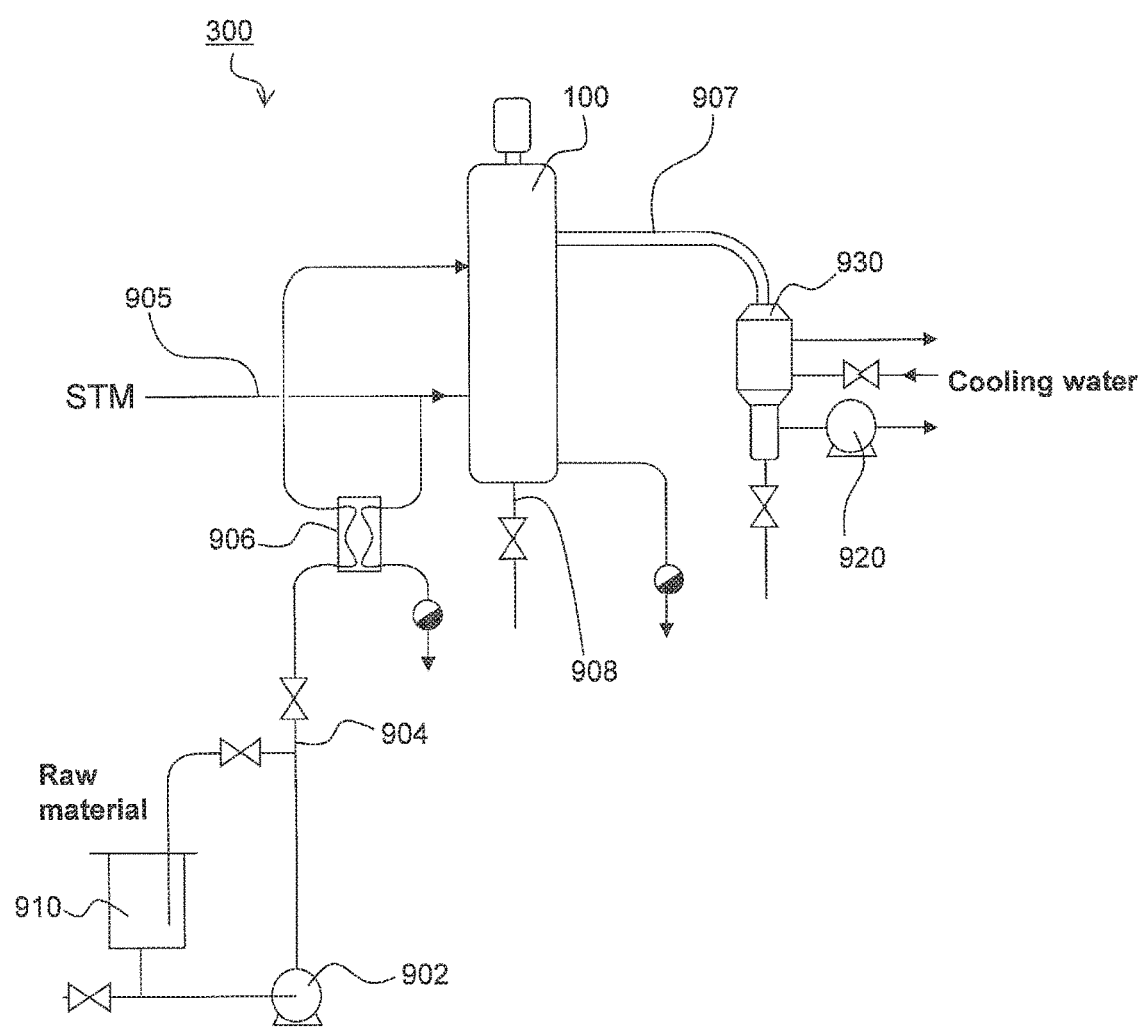
FIG. 11 is a diagram schematically showing an evaporation system including the evaporation device of the present invention.

FIG. 11 is a diagram schematically showing an evaporation system including the evaporation device of the present invention that has been described above.

An evaporation system 300 of the present invention includes a raw material tank 910 to contain a raw material liquid serving as a raw material, the evaporation device 100 (e.g., evaporation device such as that shown in any one of FIGS. 1 and 3 to 10) of the present invention, a vacuum pump 920, and a condenser 930.

The raw material liquid is caused to flow from the raw material tank 910 to a preheater 906 through a conduit 904 by driving of the pump 920, temporarily preheated in the preheater 906, and then fed to the evaporation device 100. The distillation device 100 is heated by a jacket in which steam (STM) separately passes through a conduit 905. A volatile component evaporated in the evaporation device 100 is supplied to the condenser 930 from the volatile component outlet of the evaporation device 100 through a conduit 907. Subsequently, the volatile component is cooled and then liquefied in the condenser 930. On the other hand, a concentrate discharged from the concentrate outlet of the evaporation device 100 is discharged to the outside through a conduit 908.

Figure 12:
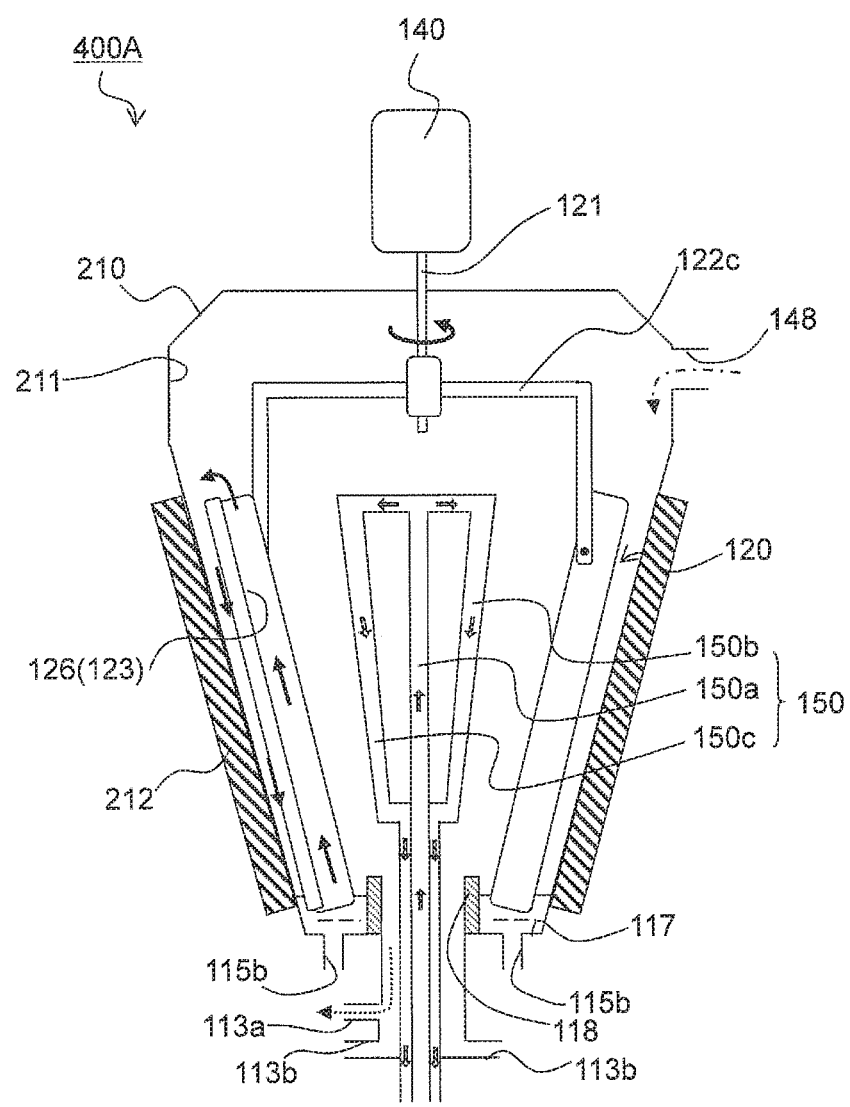
FIG. 12 is a schematic diagram showing yet another example of the evaporation device of the present invention, and schematically shows an evaporation device including a condenser within an agitation vessel.

FIG. 12 is a schematic diagram showing yet another example of the evaporation device of the present invention, and schematically shows an evaporation device including a condenser within an agitation vessel.

In an evaporation device 400A shown in FIG. 12, constituent elements denoted by the same reference numerals as those shown in the above-described drawings are the same as those shown in the above-described drawings.

The evaporation device 400A shown in FIG. 12 is configured such that, within the agitation vessel 210 (having an inverted conical shape, for example) whose diameter decreases from the upper side toward the lower side, the channel parts 123 are suspended from above by an attachment part 122c provided on the rotating shaft 121 that is coupled to the motor 140. Each of the channel parts 123 is disposed inclined so as to be substantially parallel to the slope of the inner wall 211 of the agitation vessel 210, and the lower end thereof extends to a position at which it can draw up the raw material liquid from the storage portion 117 where the raw material liquid is received. Moreover, in the evaporation device 400A in FIG. 12, a condenser 150 is disposed substantially at the center of the agitation vessel 210. The condenser 150 includes a cooling main conduit 150a through which a cooling medium such as cooling water flows from the outside toward the inside of the agitation vessel 210, and cooling branch conduits 150*b* and 150*c* which branch from the cooling main conduit 150*a* and through which the cooling medium flows from the inside toward the outside of the agitation vessel 210. The condenser 150 has a size that enables it to be inserted into the agitation vessel from below, for example. Alternatively, the condenser 150 can also be disposed by suspending it through a lid (not shown) of the agitation vessel prior to installing the channel parts 123 and the attachment part 122*c*, for example. The condenser 150 has, for example, an inverted conical external shape whose diameter decreases from the upper side toward the lower side, and, for example, cooling water is supplied (not shown) from the outside of the agitation vessel 210 using a method that is well known to a person skilled in the art. The volatile component that has evaporated from the raw material liquid flowing down the inner wall 211 of the agitation vessel 210 condenses on the condenser 150, liquefies again, and falls as liquid droplets toward the center of the bottom of the agitation vessel 210.

Moreover, in the evaporation device 400A, a volatile component outlet 113*b* for discharging the liquid droplets that have fallen from the condenser 150 to the outside is provided at the center of the bottom of the agitation vessel 210. A branch conduit 113*a* coupled to a vacuum pump (not shown) is provided in a portion of the volatile component outlet 113*b*, and the liquid droplets from the condenser 150 are discharged to the outside through the volatile component outlet 113*b* under a reduced pressure produced by the vacuum pump.

Furthermore, in the evaporation device 400A, after the raw material liquid supplied from the raw material supply port 148 has flowed down the inner wall 211 of the agitation vessel 210, and the volatile component has evaporated, the raw material liquid containing remaining components is received in the storage portion 117. Subsequently, the raw material liquid received in the storage portion 117 moves upward from the lower side of each channel part 123 again through the flow passage 126 of that channel part 123 due to the rotation of the rotating shaft 121, and is then distributed over the inner wall 211. Thus, the evaporation of the volatile component contained in the raw material liquid is repeatedly performed, and the raw material liquid is gradually concentrated and received in the storage portion 117.

In the embodiment shown in FIG. 12, before the raw material liquid in the storage portion 117 exceeds the partition wall portion 118, the raw material liquid can be discharged to the outside via a concentrate outlet 115*b* provided in the bottom of the storage portion 117. A valve, which is not shown, is provided outside the concentrate outlet 115*b*, and the raw material liquid received in the storage portion 117 can be discharged to the outside as a concentrate by opening and closing the valve.

An evaporation device such as that shown in FIG. 12 is also called a short path distillation device and is capable of performing evaporation and condensation of a raw material liquid under a high vacuum.

Figure 13:
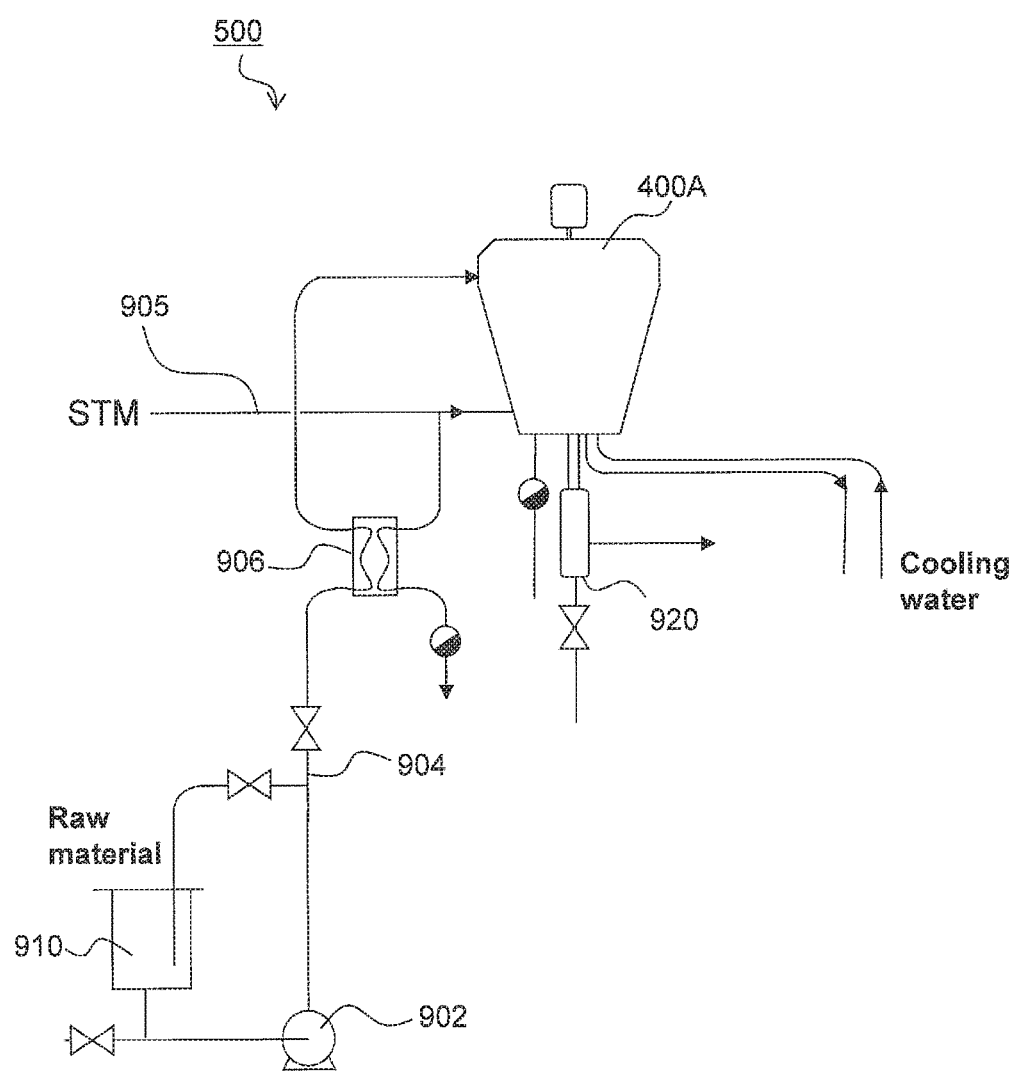
FIG. 13 is a diagram schematically showing the configuration of an evaporation system using the evaporation device of the present invention shown in FIG. 12.

FIG. 13 is a diagram schematically showing the configuration of an evaporation system using the evaporation device of the present invention shown in FIG. 12.

An evaporation system 500 of the present invention includes the raw material tank 910 to contain a raw material liquid serving as a raw material, the evaporation device 400A of the present invention, and the vacuum pump 920.

The raw material liquid is caused to flow from the raw material tank 910 to the preheater 906 through the conduit 904 by driving of the pump 902, temporarily preheated in the preheater 906, and then fed to the evaporation device 400A. The distillation device 400A is heated by the jacket in which steam (STM) separately passes through the conduit 905. The volatile component that has evaporated in the evaporation device 400A is condensed by the condenser within the device and discharged by the vacuum pump 920, which is provided outside, via the volatile component outlet.

As described above, the evaporation system 500 of the present invention shown in FIG. 13 can have a more space-saving configuration without having to separately provide a condenser in the system.

Figure 14:
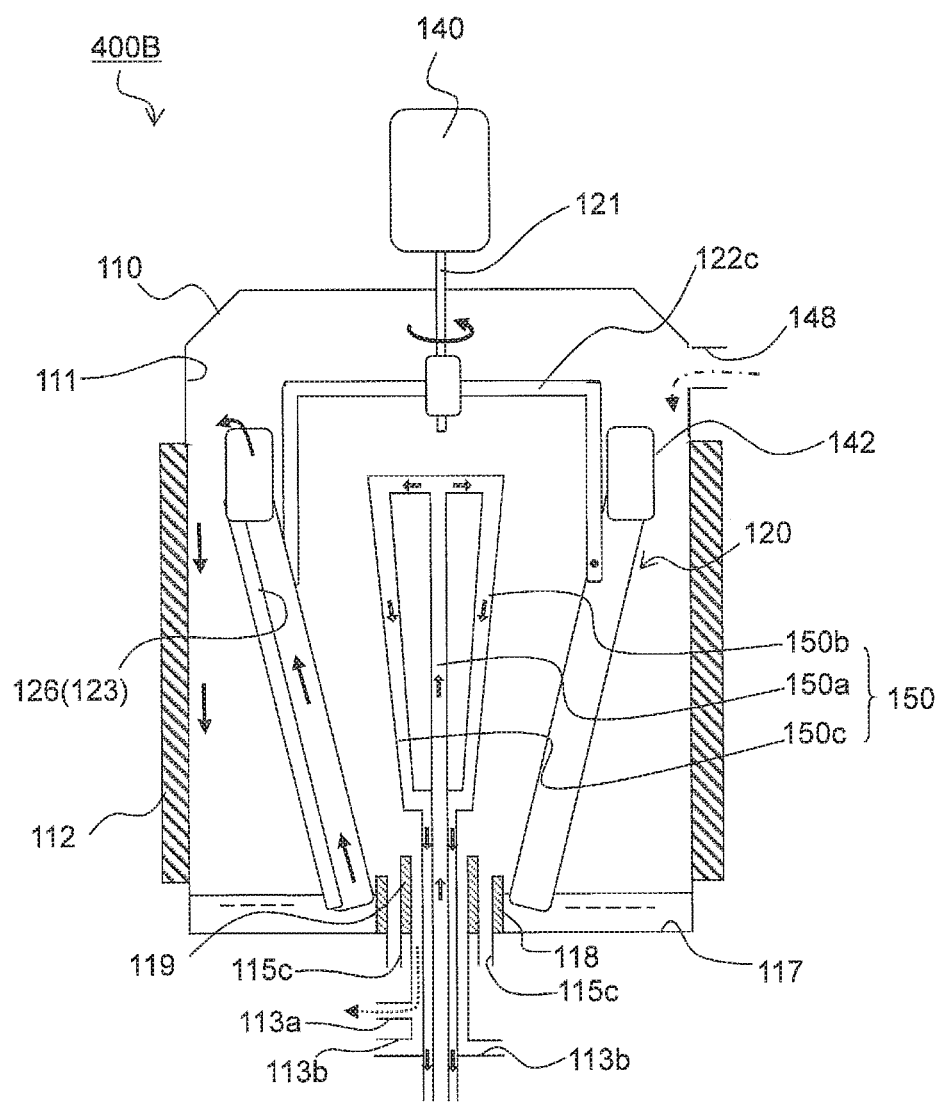
FIG. 14 is a schematic diagram showing yet another example of the evaporation device of the present invention, and schematically shows an evaporation device including a condenser within an agitation vessel.

FIG. 14 is a schematic diagram showing yet another example of the evaporation device of the present invention, and schematically shows an evaporation device including a condenser within an agitation vessel.

In an evaporation device 400B shown in FIG. 14, constituent elements denoted by the same reference numerals as those shown in the above-described drawings are the same as those shown in the above-described drawings.

The evaporation device 400B shown in FIG. 14 is configured such that, within the agitation vessel 110, the channel parts 123 are suspended from above by the attachment part 122*c* provided on the rotating shaft 121 that is coupled to the motor 140. Each of the channel parts 123 is disposed inclined so as to be substantially parallel to the slope of the inner wall 111 of the agitation vessel 110, and the lower end thereof extends to a position at which it can draw up the raw material liquid from the storage portion 117 where the raw material liquid is received. Furthermore, the mist separator 142 is provided at the upper end portion of each channel part 123. Moreover, in the evaporation device 400B in FIG. 14, the condenser 150 is disposed substantially at the center of the agitation vessel 110. The condenser 150 includes the cooling main conduit 150*a* through which a cooling medium, such as cooling water, flows from the outside toward the inside of the agitation vessel 110 and the cooling branch conduits 150*b* and 150*c* which branch from the cooling main conduit 150*a* and through which the cooling medium flows from the inside toward the outside of the agitation vessel 110. The condenser 150 has a size that enables it to be inserted into the agitation vessel from below, for example. Alternatively, the condenser 150 can also be disposed by suspending it through the lid (not shown) of the agitation vessel prior to installing the channel parts 123 and the attachment part 122*c*, for example. The condenser 150 has, for example, an inverted conical external shape whose diameter decreases from the upper side toward the lower side, and the cooling water is supplied from the outside of the agitation vessel 110 using a method that is well known to a person skilled in the art. The volatile component that has evaporated from the raw material liquid flowing down the inner wall 111 of the agitation vessel 110 condenses on the condenser 150, liquefies again, and falls as liquid droplets toward the center of the bottom of the agitation vessel 110.

Moreover, in the evaporation device 400B, the volatile component outlet 113*b* for discharging the liquid droplets that have fallen from the condenser 150 to the outside is provided at the center of the bottom of the agitation vessel 110. The branch conduit 113*a* coupled to the vacuum pump (not shown) is provided in a portion of the volatile component outlet 113*b*, and the liquid droplets from the condenser 150 are discharged to the outside through the volatile component outlet 113*b*.

Furthermore, in the evaporation device 400B, after the raw material liquid supplied from the raw material supply port 148 has flowed down the inner wall 111 of the agitation vessel 110, and the volatile component has evaporated, the raw material liquid containing remaining components is received in the storage portion 117. The raw material liquid received in the storage portion 117 moves upward from the lower side of the channel parts 123 again through the flow passages 126 of the channel parts 123 due to the rotation of the rotating shaft 121, and is then distributed over the inner wall 111 via the mist separators 142. Thus, evaporation of the volatile component contained in the raw material liquid is repeatedly performed, and the raw material liquid is gradually concentrated and received in the storage portion 117.

In the embodiment shown in FIG. 14, the raw material liquid received in the storage portion 117 gradually increases, and when the liquid level exceeds the partition wall portion 118, the raw material liquid overflows and can be discharged to the outside as a concentrate via a concentrate outlet 115*c*. It should be noted that, in the present invention, in the bottom of the agitation portion 110, a second partition wall portion 119 is provided inward of (nearer to the center of the agitation vessel 110 than) the partition wall portion 118 constituting the storage portion 117. In the present invention, preferably, an arrangement is adopted in which the top end of the partition wall portion 118 is located below the top end of the second partition wall portion 119. The purpose of this is to avoid a situation where the raw material liquid overflowing from the storage portion 117 over the partition wall portion 118 flows over the second partition wall portion 119 into the volatile component outlet 113*b* and is thus mixed with liquid droplets of the volatile component passing through that outlet.

Figure 15:
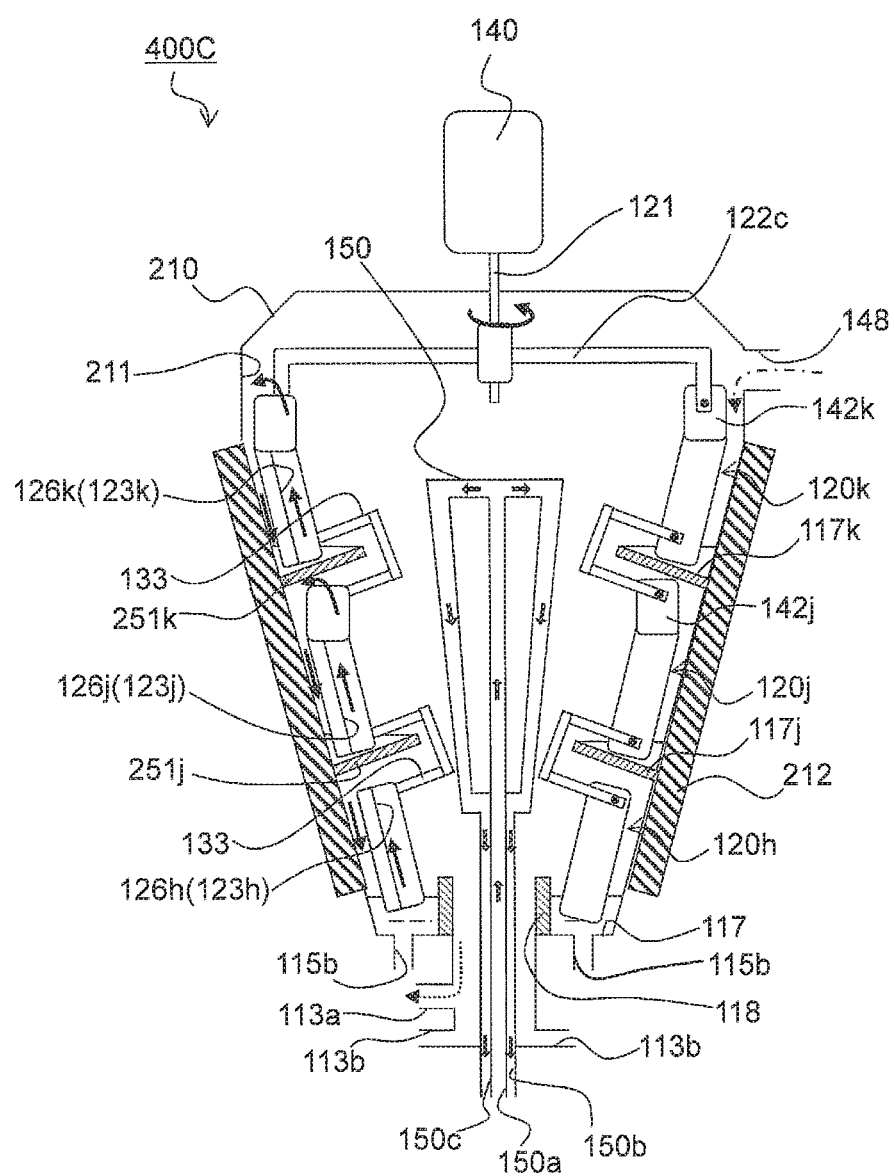
FIG. 15 is a schematic diagram showing yet another example of the evaporation device of the present invention, and schematically shows an evaporation device including a condenser within an agitation vessel.
Figure 16:
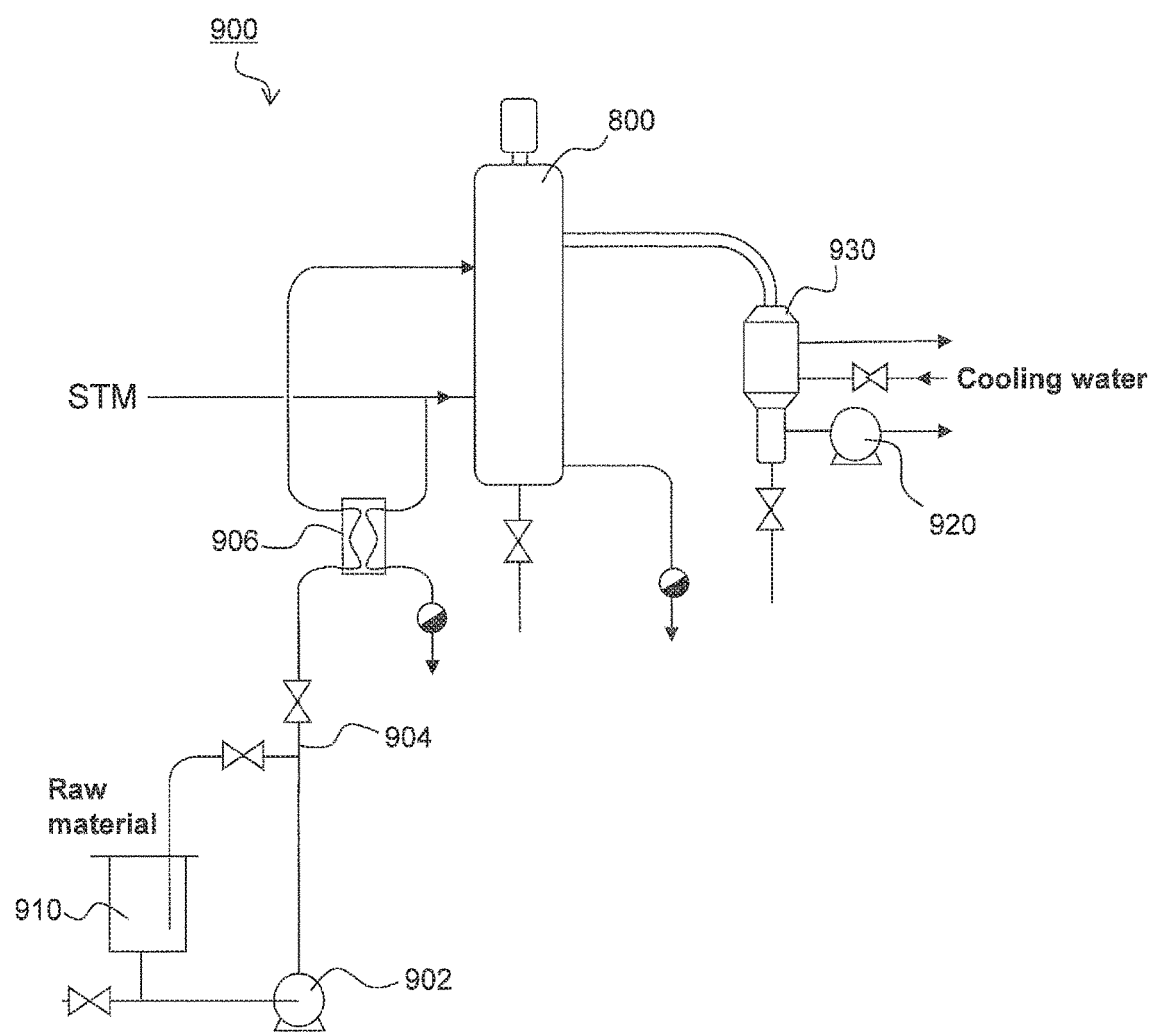
FIG. 16 is a diagram schematically showing an evaporation system including a conventional falling film evaporation device.
Figure 17:
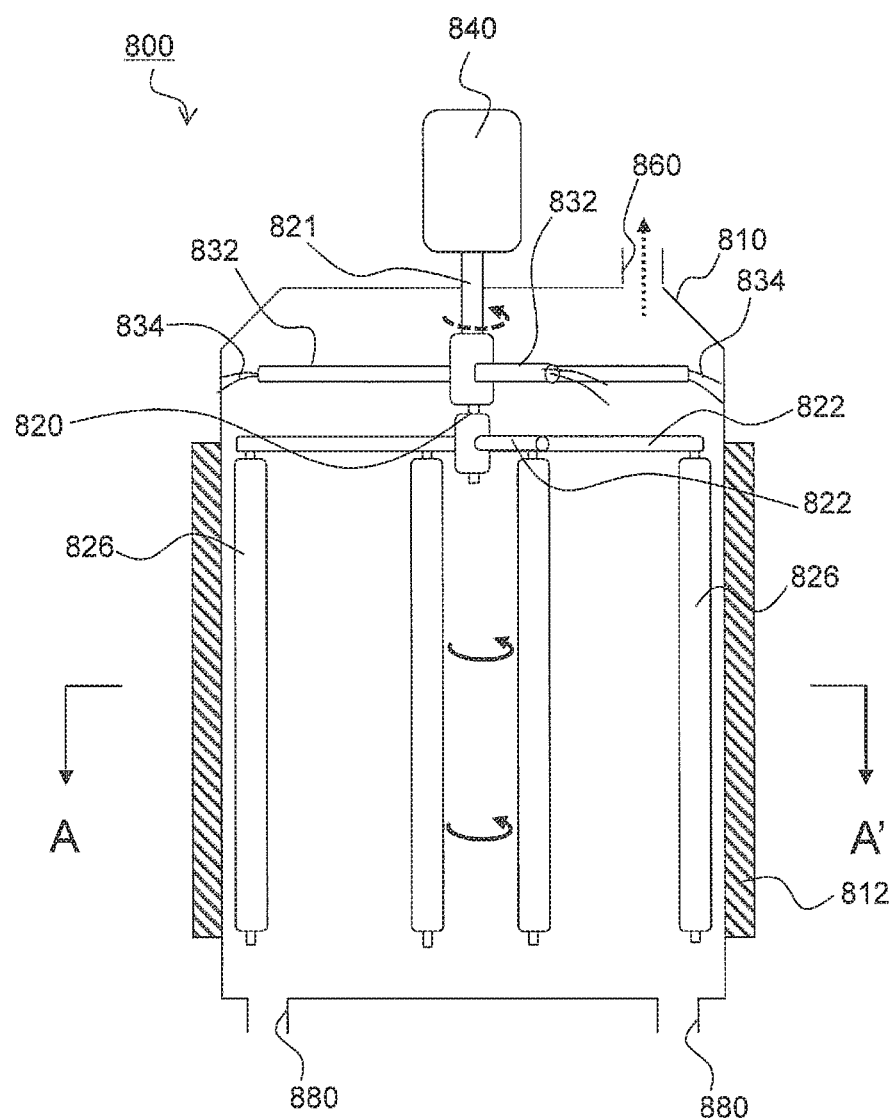
FIG. 17 is a diagram schematically showing a portion of a cross section of an evaporation device 800 constituting the evaporation system shown in FIG. 16.
Figure 18:
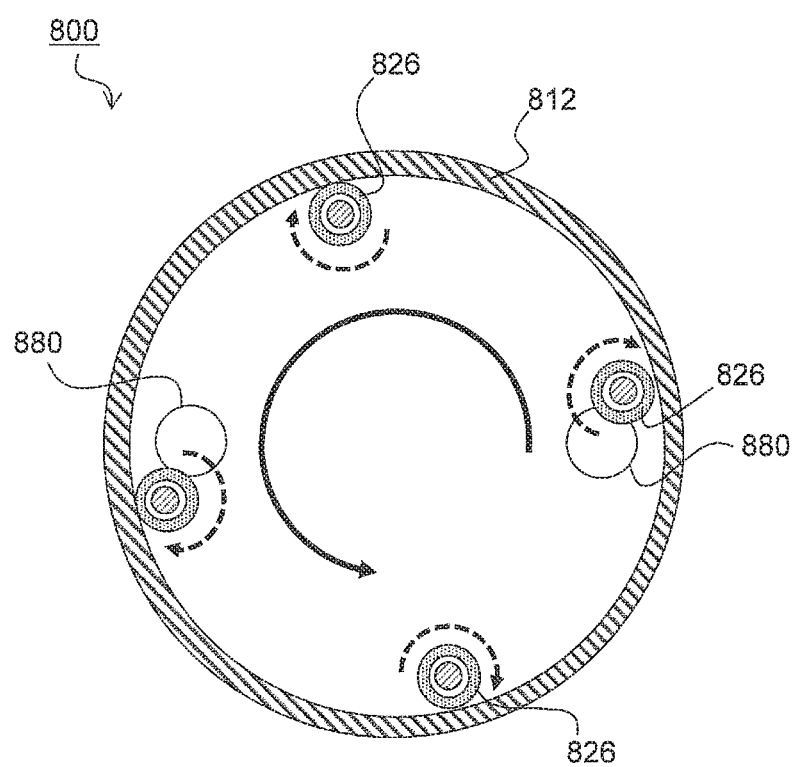
FIG. 18 is a diagram schematically showing a cross section of the conventional evaporation device shown in FIG. 17 taking in the direction A-A'.

FIG. 15 is a schematic diagram showing yet another example of the evaporation device of the present invention, and schematically shows an evaporation device including a condenser within an agitation vessel.

In an evaporation device 400C shown in FIG. 15, constituent elements denoted the same reference numerals as by those shown in the above-described drawings are the same as those shown in the above-described drawings.

The evaporation device 400C shown in FIG. 15 is configured such that, within the agitation vessel 210 (having an inverted conical shape, for example) whose diameter decreases from the upper side toward the lower side, liquid-distributing portions 120*h*, 120*j*, and 120*k* that are arranged in three levels in the up-down direction are suspended from above by the attachment part 122*c* provided on the rotating shaft 121 that is coupled to the motor 140. Here, as the liquid-distributing portions arranged in the three levels, first channel parts 123*h* in the lowest level, second channel parts 123*j* in the middle level, and third channel parts 123*k* in the highest level are arranged in this order. An upper end portion of each of the first channel parts 123*h* is fixed to a lower end portion of a corresponding one of the second channel parts 123*j* via a coupler 133, and an upper end portion of each of the second channel parts 123*j* (more specifically, a mist separator 142*j* provided at the upper end portion of each of the second channel parts 123*j*) is fixed to a lower end portion of a corresponding one of the third channel parts 123*k* via a coupler 133. Furthermore, an upper end portion of each of the third channel parts 123*k* (more specifically a mist separator 142*k* provided at the upper end portion of each of the third channel parts 123*k*) is fixed to the attachment part 122*c*.

Each of the liquid-distributing portions 120*h*, 120*j*, and 120*k* is disposed inclined so as to be substantially parallel to the slope of the inner wall 211 of the agitation vessel 210, and a lower end thereof extends to a position at which it can draw up the raw material liquid from a corresponding one of storage portions 117, 117*j*, and 117*k* where the raw material liquid is received. Moreover, in the evaporation device 400C in FIG. 15, the condenser 150 is disposed substantially at the center of the agitation vessel 210. The condenser 150 includes the cooling main conduit 150*a* through which a cooling medium, such as cooling water, flows from the outside toward the inside of the agitation vessel 210 and the cooling branch conduits 150*b* and 150*c* which branch from the cooling main conduit 150*a* and through which the cooling medium flows from the inside toward the outside of the agitation vessel 210. The condenser 150 has a size that enables it to be inserted into the agitation vessel from below, for example. Alternatively, the condenser 150 can also be disposed by suspending it through the lid (not shown) of the agitation vessel prior to installing the channel parts 123 and the attachment part 122*c*, for example. The condenser 150 has, for example, an inverted conical external shape whose diameter decreases from the upper side toward the lower side, and the cooling water is supplied (not shown) from the outside of the agitation vessel 210 using a method that is well known to a person skilled in the art. The volatile component that has evaporated from the raw material liquid flowing down the inner wall 211 of the agitation vessel 210 condenses on the condenser 150, liquefies again, and falls as liquid droplets toward the center of the bottom of the agitation vessel 210.

Moreover, in the evaporation device 400C, the volatile component outlet 113*b* for discharging the liquid droplets that have fallen from the condenser 150 to the outside is provided at the center of the bottom of the agitation vessel 210. The branch conduit 113*a* coupled to the vacuum pump (not shown) is provided in a portion of the volatile component outlet 113*b*, and the liquid droplets from the condenser 150 are discharged to the outside through the volatile component outlet 113*b*.

Furthermore, in the evaporation device 400C, after the raw material liquid supplied from the raw material supply port 148 has flowed down the inner wall 122 of the agitation vessel 210, and the volatile component has evaporated, the raw material liquid containing remaining components is received in the third storage portion 117*k*. The raw material liquid received in the third storage portion 117*k* moves upward from the lower side of the third channel parts 123*k* again through flow passages 126*k* of the respective third channel parts 123*k* due to the rotation of the rotating shaft 121, and is then distributed over the inner wall 211. Thus, the evaporation of the volatile component contained in the raw material liquid is repeatedly performed, and the raw material liquid is gradually concentrated and received in the third storage portion 117*k*.

Here, in the evaporation device 400C shown in FIG. 15, the third storage portion 117*k* is constituted by a flat plate-like part 251*k* extending along the inclined inner wall so as to be substantially perpendicular thereto. With this configuration, the third storage portion 117*k* can receive a predetermined amount of raw material liquid without the need to separately provide a partition wall portion.

Afterward, the liquid level in the third storage portion 117*k* rises, and the raw material liquid overflows and is thus received in the second storage portion 117*j*, which is located in the level immediately below.

The raw material liquid received in the second storage portion 117*j* is, due to the rotation of the rotating shaft 121, drawn up from the lower end to the upper end of the second channel parts 123*j* through flow passages 126*j* of the respective second channel parts 123*j*, and is then distributed over and flows down the inner wall 111 from the mist separators 142j provided at the upper end portions of the respective second channel parts 123j. While the raw material liquid flows down, the volatile component contained in the raw material liquid evaporates. The raw material liquid containing the other components remaining therein is again received in the second storage portion 117j, and the drawing-up by the second channel parts 123j is repeated.

Here, in the evaporation device 400C shown in FIG. 15, the second storage portion 117j is constituted by a flat plate-like part 251j extending along the inclined inner wall so as to be substantially perpendicular thereto. With this configuration, the second storage portion 117j can receive a predetermined amount of raw material liquid without the need to separately provide a partition wall portion.

Afterward, the liquid level in the second storage portion 117j rises, and the raw material liquid overflows and is received in the storage portion 117, which is located in the lowest level.

The raw material liquid received in the storage portion 117 is, due to the rotation of the rotating shaft 121, drawn up from the lower end to the upper end of the first channel parts 123h through flow passages 126h of the respective first channel parts 123h, and is then distributed over and flows down the inner wall 211 from the upper end portions of the respective first channel parts 123h. While the raw material liquid flows down, the volatile component contained in the raw material liquid evaporates. The raw material liquid containing the other components remaining therein is again received in the storage portion 117, and the drawing-up by the first channel parts 123h is repeated.

In the embodiment shown in FIG. 15, before the raw material liquid in the storage portion 117 flows over the partition wall portion 118, the raw material liquid can be discharged to the outside via the concentrate outlet 115b provided in the bottom of the storage portion 117. A valve, which is not shown, is provided outside the concentrate outlet 115b, and the raw material liquid received in the storage portion 117 can be discharged to the outside as a concentrate by opening and closing the valve.

The evaporation device of the present invention is useful in, for example, the purification and concentration of a liquid containing impurities, for example, liquids such as methyl ester, lactic acid, fish oil, oils and fats, and glycerin; the removal of water, ethanol, methyl ethyl ketone (MEK), N-methyl pyrrolidone (NMP), hexane, toluene, acetone, ethylene glycol, and the like contained in chemical products such as ink, paints, and chemicals; and the removal of volatile impurities from monomers, polymers, and the like that are used in the fields of paint production and resin production.

LIST OF REFERENCE NUMERALS 100, 100A, 400A evaporation device
110, 210 agitation vessel
111, 211 inner wall
112, 212 jacket
113, 113b volatile component outlet
115, 115b, 115c concentrate outlet
117 storage portion
118 partition wall portion
120 liquid-distributing portion
121 rotating shaft
122a, 122b, 122c attachment part
123 channel part
126 flow passage
130 supply pipe
131, 148 raw material liquid supply port
140 motor
142 mist separator
146 plate-like part
150 condenser
300, 500 evaporation system

The invention claimed is:

1. An evaporation device comprising:
an agitation vessel to which a raw material liquid is supplied, wherein the agitation vessel has a volatile component outlet and a concentrate outlet;
a jacket provided on an outer circumference of the agitation vessel and configured to heat an inner wall of the agitation vessel; and
a liquid-distributing portion provided within the agitation vessel and configured to cause the raw material liquid to flow down the inner wall of the agitation vessel,
wherein the agitation vessel includes a storage portion surrounded by a bottom of the agitation vessel, the inner wall, and a partition wall portion and configured to temporarily store the raw material liquid that has flowed down,
the liquid-distributing portion is constituted by a rotating shaft and at least one channel part with an end portion thereof inserted in the storage portion, the channel part having a flow passage through which, as the rotating shaft rotates, the raw material liquid temporarily stored in the storage portion flows upward from a lower side of the agitation vessel, and the channel part being mounted to the rotating shaft,
the concentrate outlet is provided approximately beneath the rotating shaft and is approximately in the center of the bottom of the agitation vessel,
the storage portion is configured to allow a concentrate to overflow over the partition wall portion, and the concentrate that has overflowed from the storage portion can be discharged through the concentrate outlet, and
an inner diameter of the partition wall portion is greater than an inner diameter of the concentrate outlet.

2. The evaporation device according to claim 1, wherein a plate-like part is provided at an upper end portion of the channel part.

3. The evaporation device according to claim 1, wherein the channel part includes a plurality of first channel parts, and the plurality of first channel parts are provided at substantially equal angles around the rotating shaft.

4. The evaporation device according to claim 3, wherein the channel part includes a plurality of second channel parts, and the plurality of second channel parts are arranged outward of the plurality of first channel parts at substantially equal angles around the rotating shaft.

5. The evaporation device according to claim 3, wherein the channel part includes a plurality of second channel parts, and, on the rotating shaft, the plurality of second channel parts are arranged above the plurality of first channel parts at substantially equal angles around the rotating shaft.

6. The evaporation device according to claim 1, wherein the volatile component outlet is provided in the bottom of the agitation vessel, a condenser is provided at the center of the agitation vessel, and a volatile component that has evaporated from the raw material liquid condenses on the condenser and is discharged via the volatile component outlet.

7. An evaporation system comprising:

a raw material tank containing a raw material liquid;

the evaporation device according to claim 1, wherein the evaporation device is configured to process the raw material liquid supplied from the raw material tank; and a condenser configured to condense a volatile component discharged from the volatile component outlet of the evaporation device.

8. An evaporation system comprising:

a raw material tank containing a raw material liquid; and the evaporation device according to claim 6, wherein the evaporation device is configured to process the raw material liquid supplied from the raw material tank.

* * * * *